(12) United States Patent
Kawamura

(10) Patent No.: US 6,541,887 B2
(45) Date of Patent: Apr. 1, 2003

(54) PERMANENT-MAGNET MOTOR-GENERATOR WITH VOLTAGE STABILIZER

(76) Inventor: Hideo Kawamura, 13-5, Okada 8-chome, Samukawa-machi, Kouza-gun, Kanagawa-ken 253-0105 (JP)

(*) Notice: Subject to any disclaimer, the term of this patent is extended or adjusted under 35 U.S.C. 154(b) by 44 days.

(21) Appl. No.: 09/922,719

(22) Filed: Aug. 7, 2001

(65) Prior Publication Data

US 2002/0047448 A1 Apr. 25, 2002

(30) Foreign Application Priority Data

Feb. 20, 2001 (JP) .......................... 2001-043103

(51) Int. Cl.$^7$ .......................... H02K 1/27; H02K 21/14
(52) U.S. Cl. .......................... 310/190; 310/181; 310/263
(58) Field of Search ................. 310/181, 190, 310/191, 168, 263, 68 B, 156, 66

(56) References Cited

U.S. PATENT DOCUMENTS

| | | | | |
|---|---|---|---|---|
| 2,802,959 A | * | 8/1957 | Powers ........................ | 310/263 |
| 3,411,027 A | * | 11/1968 | Rosenberg .................. | 310/190 |
| 3,555,327 A | * | 1/1971 | Terry .......................... | 310/168 |
| 3,599,024 A | * | 8/1971 | Kitamura .................... | 310/263 |
| 3,663,846 A | * | 5/1972 | Wagner et al. .............. | 310/164 |
| 5,767,601 A | * | 6/1998 | Uchiyama ................... | 310/190 |

FOREIGN PATENT DOCUMENTS

| | | | |
|---|---|---|---|
| JP | 62-272850 | 11/1987 | |
| JP | 7-236260 | 9/1995 | |
| JP | 2000-261995 | 3/1999 | |
| JP | 2000-354358 | 6/1999 | |
| JP | 2000-261994 | * 9/2000 | ............ H02K/1/27 |
| JP | 2000-261996 | 9/2000 | |

* cited by examiner

*Primary Examiner*—Tamai I Karl
(74) *Attorney, Agent, or Firm*—Browdy and Neimark, P.L.L.C.

(57) ABSTRACT

A motor-generator is disclosed, in which electromagnet coils are arranged at axially opposite ends of the stator, each to each end, while connections among winding sets are changed in response to the rpm of the rotor. This makes it possible to control the voltage, either at high speed or at low speed, thereby increasing the torque at low speed, or the torque on the rotor shaft at low speed and rendering the voltage stable. A rotor is comprised of a cylindrical magnetic path axially elongating to extent confronting the electromagnet coils, and a permanent-magnet member of more than one permanent-magnet piece extending axially over the magnetic path. The cylindrical magnetic path includes an N-pole annular portion confronting any one of the electromagnet coils, N-pole electromagnet magnetic paths stemming from the N-pole annular portion in opposition to N-poles of the permanent-magnet pieces, an S-pole annular portion arranged confronting another of the electromagnet coils, and S-pole electromagnet magnetic paths stemming from the S-pole annular portion in opposition to S-poles of the permanent-magnet pieces.

29 Claims, 10 Drawing Sheets

(A)

High tension side

Low tension side (B) Low-voltage, high-current model (A)

(B)

PERMANENT-MAGNET MOTOR-GENERATOR WITH VOLTAGE STABILIZER

BACKGROUND OF THE INVENTION

1. Field of the Invention

The present invention relates to a motor-generator, which is comprised of a rotor of permanent-magnet pieces supported for rotation in a stator housing, a stator surrounding around an outside periphery of the rotor, and magnet coils arranged at axially opposing ends of the stator, each to each end, to keep a voltage steady.

2. Description of the Prior Art

Modern advanced permanent magnets of high performance have become much employed on a rotor of a motor-generator. Moreover, as the motor-generator having the rotor structure of permanent magnets is high in efficiency of electromechanical energy conversion and simple in construction, its use has recently grown in industrial machines and instruments of various kinds. Then, much research and development have continued to make the motor-generator compact or slim in construction, with even high performance and high power output, and correspondingly necessitated a diversity of parts and components.

In order to increase a torque at low speed in operation of the conventional motor-generator, it is effective to increase the strength of the magnetic field of the stator around the rotor, thereby raising the torque. With the motors, thus, increasing well the torque causes the increase of electromotive force at a low speed, contributing to the provision of commercially viable power source for machines. Among the rotating machinery employing the permanent-magnet rotor is, for example a permanent-magnet rotating machine disclosed in Japanese Patent Laid-Open No. 272850/1987. The prior permanent-magnet rotating machine has a rotor in which permanent magnets are arranged and containers are provided to contain therein magnetic material that is allowed to flow radially owing to the revolution of the rotor to thereby form magnetic pole pieces.

Moreover, another prior art of an a-c motor-generator capable of developing a high-power output is disclosed in Japanese Patent Laid-Open No. 236260/1995, in which a magnetic flux density is controlled in proportion to the speed in revolutions per minute (rpm) of the rotor to adjust properly an amount of the generated amperes or voltages. A control ring is arranged between the rotor and the stator for rotation relatively of them and further a permeable member is provided in such a manner as to come in and out contact with the control ring.

Further disclosed in Japanese Patent Laid-Open No. 261996/2000, which is co-pending application of the present inventor, is a high-torque motor-generator in which the permeable member is made of amorphous alloys to allow the magnetic forces to pass effectively through the small spaces, thereby increasing the torque at low speed in rpm of the rotor. The prior motor-generator is comprised of permeable members arranged in juxtaposition around a rotor shaft with nonmagnetic members being each interposed between any two adjoining permeable pieces, a magnetic path core arranged surrounding the outside periphery of the permeable members, platy permanent-magnets arranged around the outside periphery of the magnetic path core, and nonmagnetic reinforcing member fixed on the outside periphery of the permanent-magnets.

In the meantime, as most automotive electric equipments are designed to require either 12V or 24V, the automotive alternators need to have the generation characteristic capable of feeding the electric power matching to the voltage recited just above. Nevertheless, the d-c power of either 12V or 24V is too low to operate other industrial machinery such as auxiliaries mounted on an automobile, in which much power is required for their operation, thus apt to be much subject to transmission loss in the associated wiring. Moreover, a major problem exists in which too thick in cross section of conductor is necessitated for windings and wirings. To cope with this, the alternator is needed producing not only the electric power of low voltage matching to the voltage required for the automotive electric equipments but also another electric power having high tension adapted to energize the auxiliaries, industrial appliances, and so on. The high tension of the generated electric power reduces the transmission loss in the wiring, rendering the conductor such as windings thin in cross section, thereby making the alternator itself compact or slim in construction.

With the permanent-magnet motor-generator, the permanent magnet is fixed in magnetic flux density and accordingly unchanged in magnetic force, either at low speed or high speed. Nevertheless, the voltage and correspondingly the output of the motor-generator rises in proportion to the increase of the rpm of the rotor. Thus, the motor-generator designed to produce the desired output voltage when the rotor is at low speed comes to yield too high voltages to control them properly. As opposed to the event stated just earlier, the way to raise the output voltage at a low speed needs to either make the permanent magnet large in size or increase the current and also increase the number of loops or turns in the winding to intensify the strength of the magnetic field at the stator side with the result of yielding great torque. However, the output voltages at the high speed also become too high to control them adequately. To increase the torque in the motor-generator, moreover, it is needed to make the conductor wound on the stator core heavy in cross section to carry large current, thereby intensifying the magnetic force in the stator.

SUMMARY OF THE INVENTION

It is a primary object of the present invention to overcome the problems stated earlier and to provide a motor-generator having a voltage stabilizer, in which windings laid in slots of a stator core are grouped into more than one winding set that are connected in series and/or parallel to continue producing a desired output voltage independently of the variations of the rotor speed in rpm, and further in which a cylindrical magnetic path extends axially of the rotor in opposition to electromagnet coils arranged at axially opposing ends of the rotor, each to each end, and conduction to the electromagnet coils is controlled in such a manner as to intensify magnetic force in permanent-magnet pieces when the output voltage is low while weaken the magnetic force when the output voltage is high, thereby always ensuring the desired output voltage.

Another object of the present invention is the provision of a motor-generator raised in torque at low speed, characterized in that the electromagnets are installed at axial opposing ends of a rotor mounted on a rotor shaft, each to each end, to lead magnetic forces created by the electromagnets to the rear of a permanent magnet through a permeable member, adding the magnetic forces to magnetic forces developed in the permanent magnet to thereby increase the torque at low speed, and in that the revolving direction of the magnetic force developed from the permanent magnet is made in a loop unlike the whirl direction of the magnetic fields created by the electromagnets to compensate for a small area in the electromagnet core where the magnetic flux is allowed to pass through there, thereby ensuring the magnetic flux density enough to control the magnetic force by either adding or subtracting the magnetic forces of the electromagnets to or from the magnetic force of the permanent magnet, and further in that permanent-magnet pierces are circumferentially arranged with nonmagnetic pieces being each interposed between any two adjoining permanent-magnet pieces, thereby forming a multipolar cylindrical permanent-magnet construction where unlike poles alternate circularly, and an electromagnet core superior in magnetic permeability is arranged inside the permanent-magnet construction, thus allowing the magnetic flux from the electromagnets to flow through there.

A further another object of the present invention is to provide a motor-generator in which electromagnets are arranged at axially opposing ends of a rotor around a rotor shaft, whereby magnetic forces created by the electromagnets are led through a permeable member to the rear of a permanent-magnet member then, followed by added to the magnetic force of the permanent magnet, thus increasing the torque at low speed, and the permanent-magnet member is composed of platy permanent-magnet pieces elongated axially of the rotor, the permanent-magnet pieces being circumferentially arranged with nonmagnetic pieces being each interposed between any two adjoining permanent-magnet pieces, thereby forming a multipolar cylindrical permanent-magnet construction where the poles alternate in polarity circularly around the rotor shaft, and an electromagnet core superior in magnetic permeability is arranged inside the permanent-magnet construction.

The present invention is concerned with a motor-generator with a voltage stabilizer, comprising a multipolar permanent-magnet rotor mounted on a rotor shaft supported for rotation in a stator housing, a stator fixed to the housing with arranged around the rotor, and electromagnet coils fixed to axially opposing ends of the housing, each to each end, in opposition to axially opposing ends of the rotor, wherein the rotor is composed of a cylindrical magnetic path arranged around the rotor shaft and extended axially to areas confronting the electromagnet coils, a permeable member surrounding around the cylindrical magnetic path, and a permanent-magnet member of more than one permanent-magnet piece extended axially and arranged circumferentially around an outside periphery of the permeable member with N- and S-poles on either piece alternating in polarity circularly around the rotor, and wherein the cylindrical magnetic path includes an N-pole annular portion arranged confronting any one of the electromagnet coils, N-pole electromagnet magnetic paths stemming from the N-pole annular portion in opposition to the N-poles of the permanent-magnet pieces, an S-pole annular portion arranged confronting another of the electromagnet coils, and S-pole electromagnet magnetic paths stemming from the S-pole annular portion in opposition to the S-poles of the permanent-magnet pieces, the N-pole and S-pole electromagnet magnetic paths alternating in polarity circularly around the permanent-magnet member with nonmagnetic pieces being each interposed between any two adjacent electromagnet magnetic paths.

In an aspect of the present invention, a motor-generator is disclosed in which around the outside periphery of the permanent-magnet member there is provided a first reinforcing member to keep the permanent-magnet member against falling off the rotor owing to a high centrifugal force, the reinforcing member being made of high tensile carbon fibers of a core material, which is impregnated with molten aluminum then, followed by solidification.

In another aspect of the present invention, there is disclosed a motor-generator in which both the N-pole and S-pole electromagnet magnetic paths are encircled with a second reinforcing member to be formed in an overall cylindrical configuration.

In another aspect of the present invention, there is disclosed in which a motor-generator is disclosed in which nonmagnetic members of a material tough to pass the magnetic force, such as aluminum, copper alloys, resinous material, austenite SUS, and so on are filled in between any tip of the N-pole electromagnet magnetic path and the S-pole cylindrical portion and also between any tip of the S-pole electromagnet magnetic path and the N-pole cylindrical portion, and a clearance between any adjacent N-pole and S-pole electromagnet magnetic paths is made larger in distance than a sum of an air gap between the rotor and the stator and a clearance between the magnetic permeable member and the rotor.

In another aspect of the present invention, a motor-generator is disclosed in which molten aluminum or resinous material of heat-resistant property is charged in any clearance between any two adjacent permanent-magnet pieces and also any clearance between any adjacent N-pole and S-pole electromagnet magnetic paths.

In another aspect of the present invention, a motor-generator is disclosed in which the stator is comprised of a stator core with stator teeth arranged spaced circumferentially apart from each other to separate any two adjacent stator slots, and windings wound on stator teeth with spanning some stator slots so as to be substantially equal out of phase, and wherein the windings are each grouped into more than one winding set shifted from each other to form three-phase wye-connections, which are allowed to be connected either in series or in parallel, so that a controller selectively changes over among output terminals led out of the connections every winding set, thus producing a desired output power in accordance with a rpm of the rotor.

In a further another aspect of the present invention, a motor-generator is disclosed in which the stator windings are grouped into low-voltage winding sets and high-voltage winding sets, and the controller regulates magnetic flux to produce two types of power, which are different in rated voltage. Moreover, the low-voltage winding sets and the high-voltage winding sets are connected in parallel to give a generation characteristic of low-voltage, large-current.

In another aspect of the present invention, a motor-generator is disclosed in which the controller serves connecting in series the output terminals led out of the connections in response to an event where the engine or rotor is low in rpm, and reducing the number of the connections made in series as the rpm raises, thereby to ensure the desired output voltage kept always constant irrespective of variation in the rpm.

In another aspect of the present invention, a motor-generator is disclosed, in which with the rotor being operated in a preselected rpm range, the controller in response to the event where the output terminals are connected to provide the output of low voltage, makes the electromagnet coils conductive in a direction to increase the N-pole magnetic force, whereas in response to another event where the output is high in voltage, makes the electromagnets conductive in a reverse direction to decrease the N-pole magnetic force, thereby providing the desired output voltage kept always constant. Moreover, the controller includes a rectifier where a produced power of the desired voltage is rectified to a d-c, and an inverter yielding an a-c of a desired frequency.

In a further another aspect of the present invention, a motor-generator is disclosed in which the controller makes the electromagnet coils conductive in a manner to reduce the magnetic force of the permanent-magnet member when the motor-generator is used as a motor.

With the motor-generator constructed as stated earlier, the desired constant voltage may be ensured irrespective of variations in rpm of the rotor. Thus, the produced voltage may be controlled properly without going too high even at high speed. Most automotive electric systems need, for example the power of about 0.5 KW~1 KW at the voltages of 12V~28V, whereas the auxiliaries or industrial equipment mounted on the automobile need the power of about 2 KW~3 KW. If someone could get the voltages of 12V~28V to cover the power of about 2 KW~3 KW for the auxiliaries, the current value would become too large, thus causing power loss with much heating. As opposed to the condition stated earlier, the auxiliaries or auxiliary equipment is allowed to operate on the high tension of about 100V~200V, thus involved in no problem of power loss in the wiring. Accordingly, the winding adapted to produce the high tension supplied to the auxiliaries, for example is allowed to make slender or thin the conductor in cross section, thereby contributing to rendering the generator slim in construction and light in weight. Besides, when any relay is used, the voltage may be more increased with the result of less current, thus protecting any contact against possible fusion.

With the motor-generator according to the present invention, simply connecting in series and/or in parallel the terminals of the windings in the winding sets is sufficient to produce the desired voltage, either at high speed or at low speed, thus, helping ensure always the proper voltage control.

According to the present motor-generator in which the electromagnet coils are arranged at the axially opposing ends of the stator, each to each end, while the permeable member extends outside the axially opposing ends of the rotor to areas confronting the electromagnet coils, when the rotor operates in the preselected rpm range, the controller in response to the event where the output terminals are connected to provide the output of low voltage, makes the electromagnet coils conductive in a direction to increase the N-pole magnetic force, whereas in response to another event where the output is high in voltage, makes the electromagnets conductive in a reverse direction to decrease the N-pole magnetic force, thereby providing the desired output voltage kept always constant.

The present invention is moreover concerned with a motor-generator in which the rotor is composed of an electromagnet core of permeable pieces extended axially to electromagnets and arranged circumferentially around the rotor shaft with nonmagnetic pieces being each interposed between any two adjacent permeable pieces, a cylindrical yoke of permeable material arranged over the electromagnet core, and a permanent-magnet member of more than one permanent-magnet piece arranged around an outside periphery of the cylindrical yoke, with nonmagnetic pieces being each interposed between any two adjacent permanent-magnet pieces, in the form of cylinder in such an array that the poles on either permanent-magnet piece alternate in polarity circularly around the rotor, and wherein the electromagnets are each composed of any one of axially opposing ends of the electromagnet core surrounding the rotor shaft, and an electromagnet coil arranged on a magnetic path case in the housing in opposition to the associated end, the electromagnet core being notches at angular intervals so as to provide magnetic circuits spaced circumferentially to flow the magnetic flux in axially but alternately opposite directions.

With the motor-generator constructed as stated just above, a current in the electromagnet coils laid on the inside surface of the magnetic path cases in the form of annular configuration induces a magnetic force in the cylindrical electromagnet core arranged over the rotor shaft, as the result of which the magnetic force created by the electromagnets is superposed on the magnetic force of the permanent magnets, thereby increasing the torque at low speed. In contrast, when the rotor is driven at high speed, a reverse current in the electromagnet coils generates a counter emf in the electromagnets to reduce the magnetic force developed by the permanent-magnets, thus erasing the excessive magnetic force to keep the torque proper at high speed. Moreover, the notches in the electromagnet core are to separate securely the lines of magnetic force apart from each other to keep the magnetic flux against leakage, thus helping ensure the path of the magnetic force from the electromagnets to the associated permanent-magnet piece in the permanent-magnet member. Thus, the controller, provided that it is set to make the electromagnet coils of the electromagnets conductive in the event of low speed, serves increasing the torque on the rotor shaft at low speed, whereas at high speed, makes the electromagnet coils conductive in reverse direction to the event of low speed, reducing the high emf at high speed.

With the motor-generator in which the controller energizes the electromagnet coils of the electromagnets in response to the event where the rpm of the rotor is small to increase the magnetic flux created by the electromagnets, it will be possible to develop a torque several times as big as the conventional rotors, thereby increasing the torque at low speed, which has been the major problem faced in the permanent-magnet motor-generator. For example, supposing the permanent magnet has the magnetic flux density of about 1.5 T, the flux density input to the stator side could reach about 2.3 T by virtue of the additional magnetic force created by the electromagnets.

In an aspect of the present invention, a motor-generator is disclosed in which the permeable pieces in the electromagnet core are each extended axially with a width equal to any one permanent-magnet piece of the permanent-magnet member so that the magnetic flux created by the electromagnets is allowed to enter the magnetic poles of the permanent-magnet member through the yoke and then flow to the stator side.

In another aspect of the present invention, a motor-generator is disclosed in which any permeable piece of the electromagnet core is arranged in opposition to the permanent-magnet piece having poles directed radially with the S-pole being outside periphery and the N-pole inside periphery, and any adjacent permeable piece is in opposition to the permanent-magnet piece with the S-pole being inside periphery and the N-pole outside periphery, thus, ensuring a flow of magnetic flux along the poles of the permanent-magnet member.

In another aspect of the present invention, a motor-generator is disclosed in which the magnetic flux passing through the rotor having the permanent-magnet pieces into the stator side flows along either a magnetic circuit coming from and entering any permanent-magnet piece through the yoke, any adjacent permanent-magnet piece, any stator tooth, a stator core and another stator tooth or other magnetic circuit opposite in direction at the permanent-magnet piece having reversed poles, and the yoke has a radial thickness that might be substantially saturated with the magnetic flux of the permanent-magnet member.

In another aspect of the present invention, a motor-generator is disclosed in which the magnetic flux created by the electromagnet passes either a closed path coming from and entering the electromagnet core through the yoke, the stator tooth, the stator core, the magnetic path case and the electromagnet coil or other magnetic path in opposite direction.

In another aspect of the present invention, a motor-generator is disclosed in which the electromagnet core is made of any material much high in magnetic permeability such as ferrite, molybdenum-nickel-iron alloy, sendust, amorphous ferroalloys, and so on.

In a further another aspect of the present invention, a motor-generator is disclosed in which a controller in response to a low speed in rpm of the rotor shaft makes the electromagnet coils conductive to superpose additional lines of magnetic force flowing through the electromagnet core on the magnetic force created by the permanent-magnet member, thereby increasing a torque at low speed of the rotor shaft.

In another aspect of the present invention, a motor-generator is disclosed in which the controller in response to a high speed of the rotor shaft makes the electromagnet coils conductive reversely in direction to the event at low speed, thus developing an additional magnetic force acting oppositely in direction to the magnetic force of the permanent-magnet member so as to reduce the torque at high speed of the rotor shaft.

In another aspect of the present invention, a motor-generator is disclosed in which on readjustment of the motor, the controller makes the electromagnets conductive in a direction opposite to the event at low speed so as to render the magnetic force of the permanent-magnet member roughly null, thereby making the occurrence of cogging less.

Moreover, the present invention relates to a motor-generator wherein the rotor is composed of permeable member of permeable pieces arranged circumferentially around the rotor shaft in the form of cylinder with nonmagnetic pieces being each interposed between any two adjacent permeable pieces, a cylindrical magnetic path core of permeable pieces arranged circumferentially over the permeable member with nonmagnetic pieces being each interposed between any two adjacent permeable pieces, and a permanent-magnet member of more than one permanent-magnet piece arranged around an outside periphery of the magnetic path core, with nonmagnetic pieces being each interposed between any two adjacent permanent-magnet pieces, in the form of cylinder in such an array that the poles on either permanent-magnet piece alternate in polarity circularly around the rotor, and wherein there are provided electromagnet cores each composed of radial extensions coming in close contact with the permeable member of the rotor to ensure axial flows of magnetic flux, and an annular portion notched at angular intervals to separate axially the radial extensions apart from the rotor.

The motor-generator constructed as stated just above is intended to realize the high torque at low speed. The electromagnet coils laid on the inside surface of the magnetic path cases in the form of annular configuration are made conductive in accordance with the instruction from the controller to induce a magnetic force in the cylindrical electromagnet core arranged over the rotor shaft. The magnetic force created by the electromagnets is superposed on the magnetic force of the permanent magnets, thereby increasing the torque at low speed. In contrast, when the rotor is driven at high speed, a reverse current in the electromagnet coils generates a counter emf in the electromagnets to reduce the magnetic force developed by the permanent-magnets, thus erasing the excessive magnetic force to keep the torque proper at high speed.

With the motor-generator in which the controller makes the electromagnet coils of the electromagnets conductive in response to the event where the rpm of the rotor is small to increase the magnetic flux created by the electromagnets, a torque several times as big as the conventional rotor alone is developed to increase the torque at low speed, which has been the major problem faced in the permanent-magnet motor-generator.

In an aspect of the present invention, a motor-generator is disclosed in which the permeable member is formed in a cylindrical configuration where platy laminations, each equal in width with any permanent-magnet piece of the permanent-magnet member, are arranged circumferentially with any nonmagnetic member being interposed between any two adjacent platy laminations to help ensure the flow of magnetic flux along the poles of the permanent-magnet member.

In another aspect of the present invention a motor-generator is disclosed in which any one electromagnet core at any one axial end of the rotor is arranged in opposition to any permanent-magnet piece, which is disposed with the N-pole being outside the curved periphery and the S-pole inside the curved periphery, whereas another electromagnet core at axially opposing end of the rotor is arranged in opposition to any permanent-magnet piece, which is disposed with the N-pole being inside the curved periphery and the S-pole outside the curved periphery, thereby helping ensure the flow of magnetic flux along the poles of the permanent-magnet member.

In another aspect of the present invention, a motor-generator is disclosed in which the radial extensions of the electromagnet core make close contact with their associated axial ends of the permeable member, the magnetic path core and the permanent-magnet member.

In a further another aspect of the present invention, a motor-generator is disclosed in which both the permeable member and the electromagnet core are made of any material much high in magnetic permeability such as ferrite, molybdenum-nickel-iron alloy, sendust, and so on.

In another aspect of the present invention a motor-generator is disclosed in which a controller in response to a low speed in rpm of the rotor shaft makes the electromagnet coils conductive to superpose additional lines of magnetic force flowing through the electromagnet core on the magnetic force created by the permanent-magnet member, thereby increasing a torque at low speed of the rotor shaft.

In another aspect of the present invention, a motor-generator is disclosed in which the controller in response to a high speed of the rotor shaft makes the electromagnet coils conductive in opposite direction to the event at low speed, thus developing an additional magnetic force acting oppositely in direction to the magnetic force of the permanent-magnet member so as to reduce the torque at high speed of the rotor shaft.

In another aspect of the present invention, a motor-generator is disclosed in which the annular portion of the electromagnet core is made integral with the permeable member.

Other objects and features of the present invention will be more apparent to those skilled in the art on consideration of the accompanying drawings and following specification wherein are disclosed preferred embodiments of the present invention with understanding that such variations, modifications and elimination of parts may be made therein as fall within the scope of the appended claims without departing from the spirit of the invention.

DETAILED DESCRIPTION OF THE PREFERRED EMBODIMENTS

A motor-generator with a voltage stabilizer in accordance with the present invention will be hereinafter described with reference to the accompanying drawings.

The present motor-generator is suitable for use, for example in the generators combined with an automotive engine mounted on vehicles such as automobiles and so on, generators incorporated in an engine for cogeneration system, generators attached to an output shaft of an engine for a hybrid vehicle, generators for supplying electric power to a heater in the diesel particulate filters mounted on vehicles, generators combined with a turbocharger to reclaim heat energy from exhaust gases, or generators mounted to energy recovery means.

Figure 1:
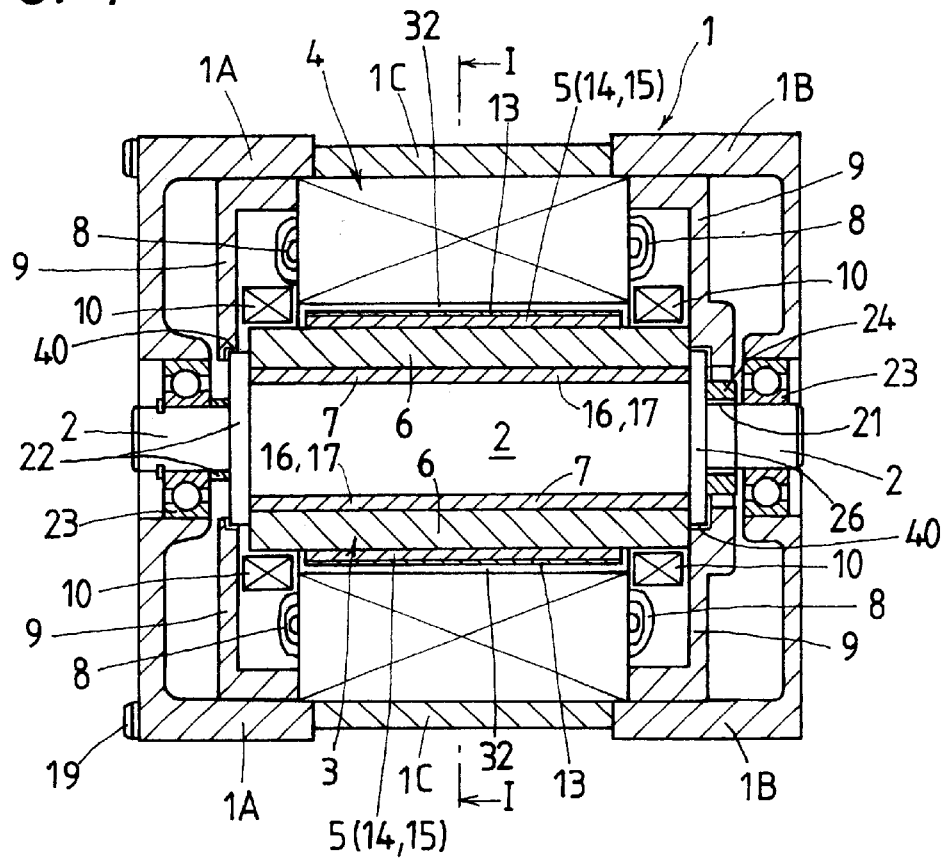
FIG. 1 is an axial sectional view showing a preferred embodiment of a motor-generator with a voltage stabilizer in accordance with the present invention.

The motor-generator of the present invention, as shown in FIG. 1, is comprised of a stator hosing 1 of a pair of housing halves 1A and 1B and an intermediate housing 1C fastened together with clamping bolts 19, a rotor shaft 2 supported for rotation in the housing halves 1A and 1B by means of a pair of axially opposite ball bearings 23, a rotor 3 of a multipolar permanent-magnet member 5 in which more than one platy permanent-magnet piece 15 is arranged circumferentially around the rotor shaft 2 at a regular interval and fixed to the rotor shaft 2, a stator 4 arranged around the outer periphery of the rotor 3 to define an air gap 32 between them and fixed to the housing halves 1A and 1B, and electromagnet coils 10 arranged in opposition to the axially opposite ends of the rotor 3, each to each end, and fixed to the housing halves 1A, 1B at the axially opposite sides of the stator 4.

The rotor 3 is accommodated for rotation in a cylindrical hollow inside the stator 4 fixed to the housing halves 1A, 1B, with keeping the air gap 32 of a preselected radial clearance. The rotor 3 is clamped between axially opposite backing plate 22 and retainer plate 26, which are abutted against axially opposing ends of the rotor 3, each to each end, and kept on the rotor shaft 2 against rotation by tightening a fixing nut 24 on a threaded end 21 of the rotor shaft 2. A motor-generator pulley fixed to any one end of rotor shaft 2 with a nut is connected through a belt to a rotating shaft, turbine shaft and so on, which are connected to the engine through any transmission system. The rotor 3 is composed of a cylindrical magnetic path 7 arranged on the rotor shaft 2 and extended axially to areas confronting the electromagnet coils 10 on the rotor shaft 2, a magnetic permeable member 6 arranged around the cylindrical magnetic path 7, and the permanent-magnet member 5 of more than one permanent-magnet piece 15 extended axially and arranged circumferentially over the outside periphery of the magnetic permeable member 6 with nonmagnetic pieces 14 being each interposed between any two adjoining permanent-magnet pieces 15. It is also to be noted that the permanent-magnet pieces 15 are arranged in such a configuration that unlike poles, or N- and S-pole, alternate in polarity circularly around the rotor 3. Around the outside periphery of the permanent-magnet member 5 there is provided a first reinforcing member 13 to keep the permanent-magnet member 5 against falling off the rotor 3 owing to a high centrifugal force, the reinforcing member 13 being made of high tensile carbon fibers of a core material, which is impregnated with molten aluminum then, followed by solidification.

Figure 3:
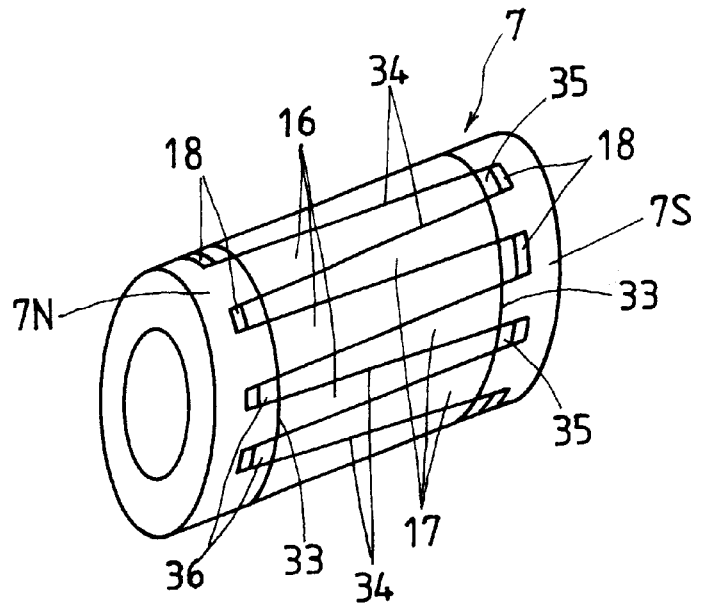
FIG. 3 is a perspective view illustrating a cylindrical magnetic path used in the motor-generator of FIG. 1.
Figure 4:
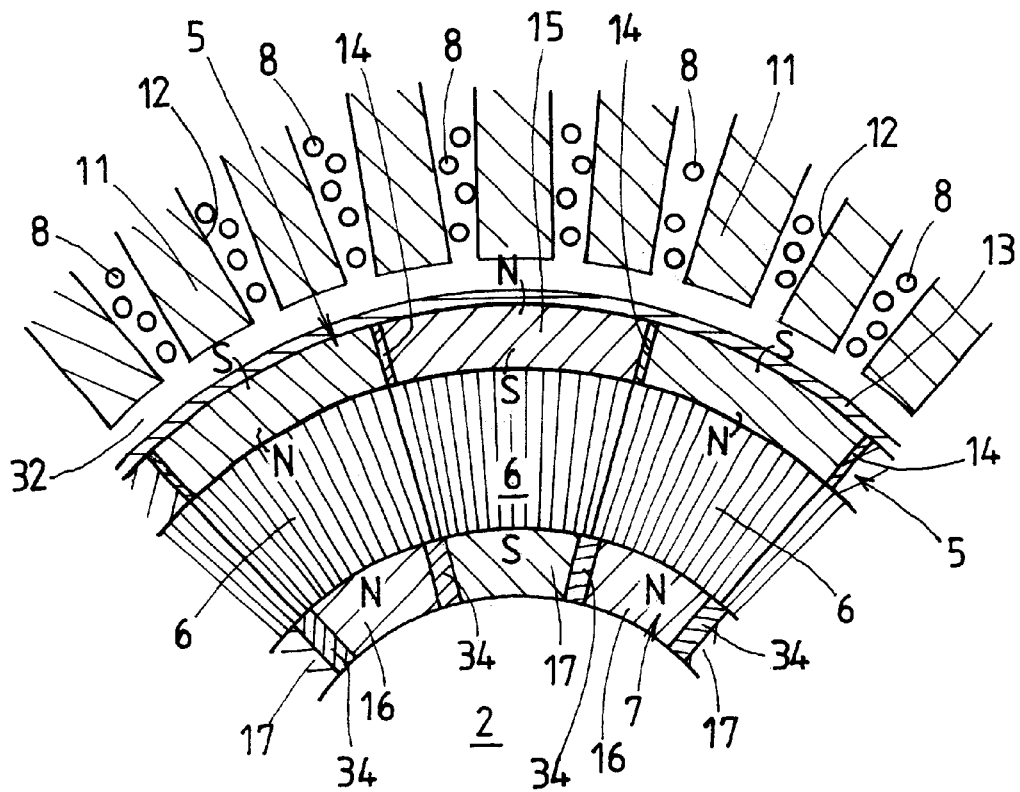
FIG. 4 is a fragmentary enlarged section showing a part encircled with a curved line B.

The cylindrical magnetic path 7, as shown particularly in FIGS. 3 and 4, includes an N-pole annular portion 7N arranged confronting any one of the electromagnet coils 10, N-pole electromagnet magnetic paths 16 stemming from the N-pole annular portion 7N in opposition to N-poles of the permanent-magnet pieces 15, an S-pole annular portion 7S arranged confronting another of the electromagnet coils 10, and S-pole electromagnet magnetic paths 17 stemming from the S-pole annular portion 7S in opposition to S-poles of the permanent-magnet pieces 15. The N-pole electromagnet magnetic paths 16 are circumferentially interdigitated with the S-pole electromagnet magnetic paths 17 with nonmagnetic members 34 being each interposed between any two adjacent N-pole and S-pole electromagnet magnetic paths 16 and 17. Both the N-pole and S-pole electromagnet magnetic path portions 7N and 7S are encircled with a second reinforcing member 33 to be formed in an overall cylindrical configuration. Moreover, nonmagnetic members 18 of a material tough to pass the magnetic force, such as aluminum, copper alloys, resinous material, austenite SUS, and so on are filled in between any tip 35 of the N-pole electromagnet magnetic path 16 and the S-pole cylindrical portion 7S and also between any tip 36 of the S-pole electromagnet magnetic path 17 and the N-pole cylindrical portion 7N. Besides, molten resinous material of heat-resistant property is charged in any clearance between any two adjacent permanent-magnet pieces 15 and also any clearance between any adjacent N-pole and S-pole electromagnet magnetic paths 16 and 17. The clearance between any adjacent N-pole and S-pole electromagnet magnetic paths 16 and 17 is made larger in distance than the sum of the air gap 32 between the rotor 3 and the stator 4 and the clearance between the magnetic permeable member 6 and a magnetic path 9 to thereby keep the magnetic flux against magnetic leakage.

Figure 2:
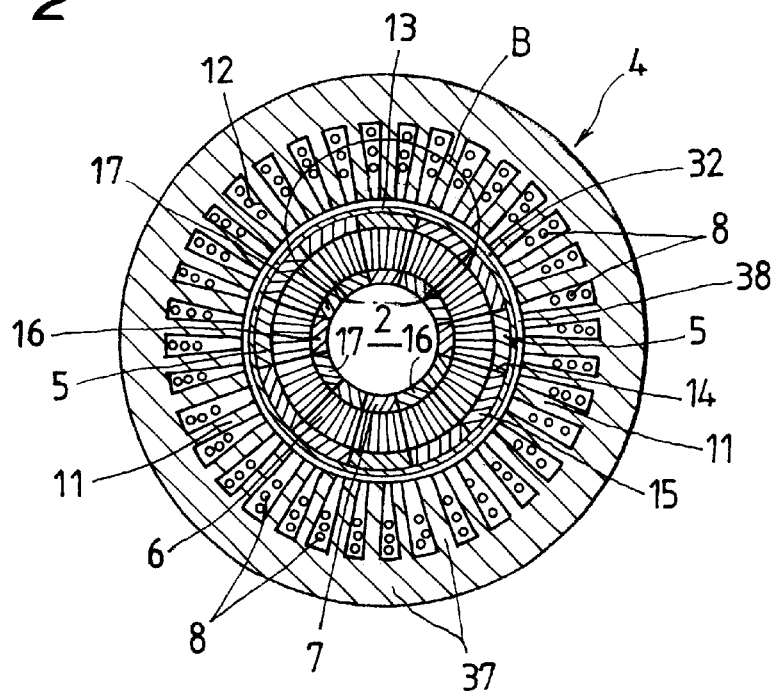
FIG. 2 is a cross-sectioned view of the motor-generator of FIG. 1 taken on the planet I—I of that figure.

As will be seen from FIGS. 2 and 4, the stator 4 is comprised of a toothed stator core 37 constructed of an outside cylindrical magnetic path 38 with stator teeth 11 arranged spaced circumferentially apart from each other to separate two adjacent stator slots 12, which open onto or near the air gap 32 kept between the outer periphery of the rotor 3 and the tooth tips, and windings 8 wound on stator teeth 11 with spanning some stator slots 12 so as to be substantially equal out of phase. Moreover, magnetic paths 9 are fixed to the housing halves 1A and 1B in opposition to the axially opposing ends of the stator 4, each to each end. The electromagnet coils 10 are mounted to their associated magnetic paths 9 to encircle the revolving magnetic permeable member 6. There is formed a magnetic path gap 40 between the inside periphery of any magnetic path 9 and the outside periphery of the rotor 3.

Figure 5:
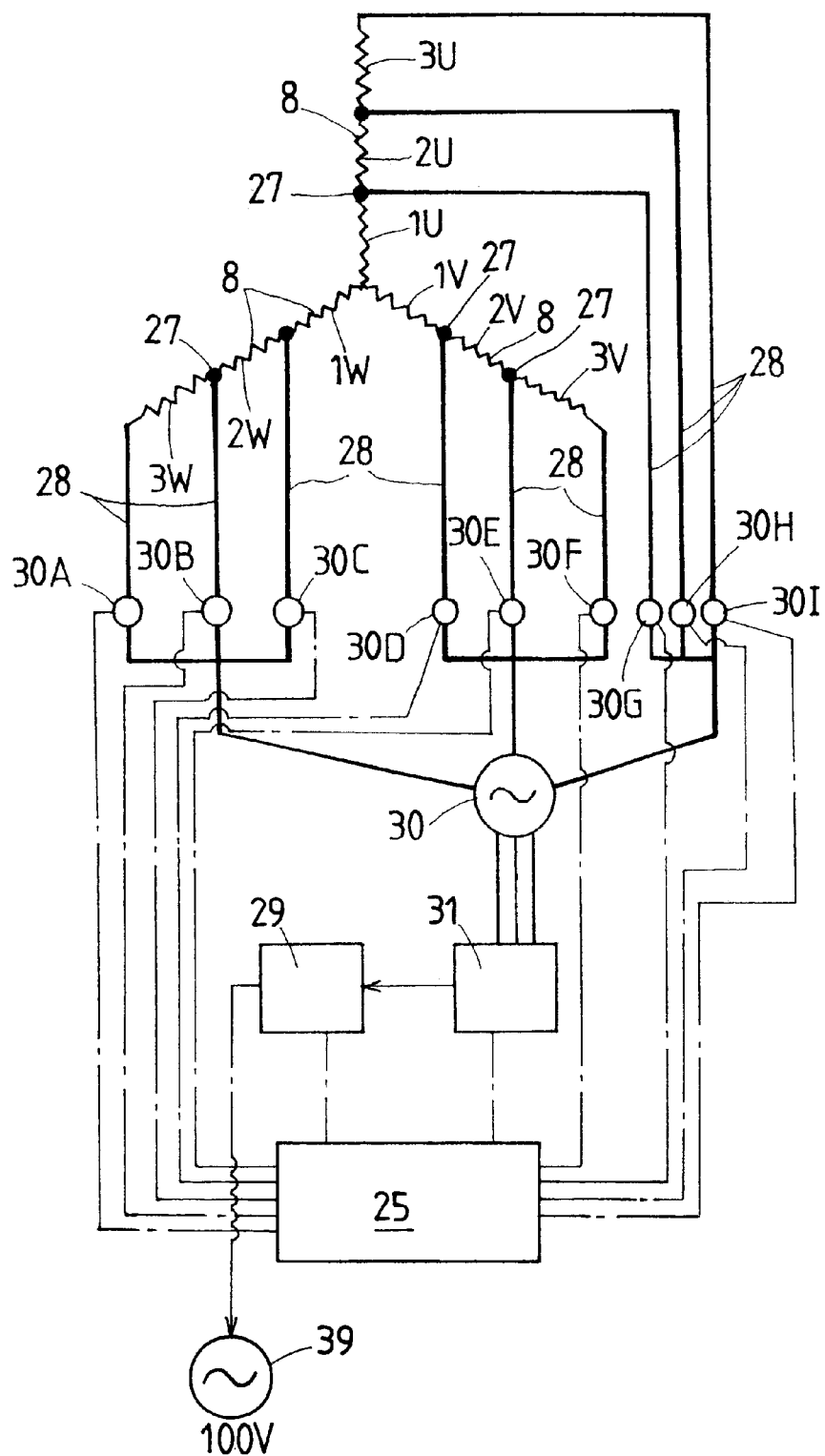
FIG. 5 is a wiring diagram explaining an example of circuit connection of the winding sets in the motor-generator of FIG. 1.
Figure 6:
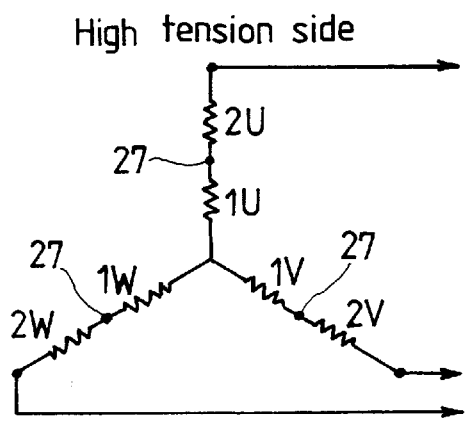
FIGS. 6(A) and (B) are wiring diagrams explaining other examples of circuit connection of the winding sets in the motor-generator of FIG. 1.
Figure 6:
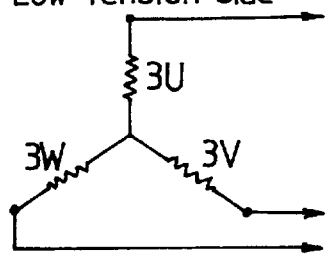
Figure 6:
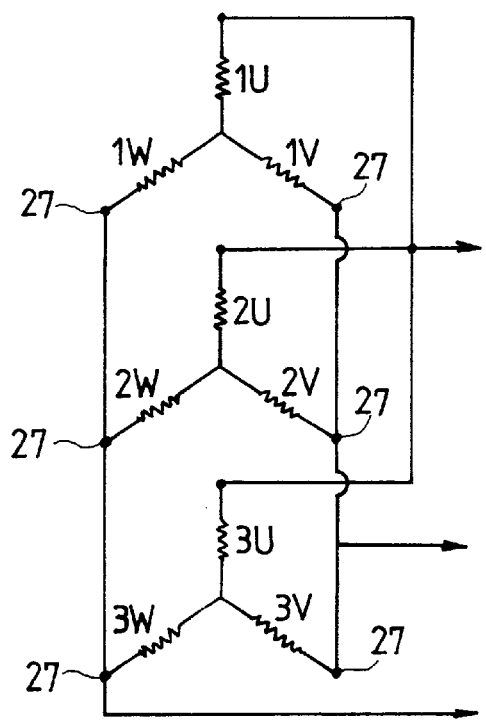

The windings 8 are each grouped into more than one winding set 1U-1V-1W, 2U-2V-2W and 3U-3V-3W that are divided circumferentially regarding the stator slots 12 of the stator core 37 and wound shifted from each other in the stator slot 12 to form three-phase wye-connections, which are allowed to be connected in series. With the permanent-magnet motor-generator constructed as stated earlier, the windings 8 belonging to any one winding set have terminals that make connections 27, refer to FIG. 5, where there are provided output terminals switched over in accordance with instructions of controller unit 25, so that any desired electric power varied depending on the rpm of the rotor may be produced. The windings 8 are grouped into, for example three winding sets as shown in FIG. 5: a first winding set (1U-1V-1W), second winding set (2U-2V-2W) and third winding set (3U-3V-3W). The windings 8 in any one winding set out of the three winding sets are wound spaced 120 electrical degrees apart to provide the three-phase system of windings helping ensure a preselected voltage. The controller unit 25 serves connecting the output terminals led out of the connections 27 either in series as in FIG. 5 or in parallel in FIG. 6(B) in response to an event where the engine or rotor 3 is low in rpm, thus reducing the number of the connections 17 made in series as the rpm raises, thereby to ensure the desired output voltage kept always constant irrespective of the varied rpm. Although but all the winding sets are shown earlier connected in series, it will be appreciated that the first and second winding sets are connected in series while only the third winding set makes another three-phase connection for the low-voltage side, as shown in FIG. 6(A).

With the rotor 3 being operated in a preselected rpm range, the controller unit 25 in response to the event where the output terminals are connected to provide the output of low voltage, makes the electromagnet coils 10 conductive in a manner flowing a current in the direction to increase the N-pole magnetic force, whereas in response to another event where the output is high in voltage, makes the electromagnets 10 conductive in a manner flowing a current in the direction to decrease the N-pole magnetic force, thereby providing the desired output voltage kept always constant. When the present permanent-magnet motor-generator is used as a motor, the controller unit 25 makes the electromagnet coils 10 conductive so as to decay the magnetic force of the permanent-magnet member 5.

The controller unit 25 is connected to the connections 27 among the winding sets through lines 28 and relays 30A, 30B, 30C, 30D, 30E, 30F, 30G, 30H and 30I. Thus, the controller unit 25 turns selectively on and/or off any selected from the relays 30A to 30I, thereby connecting selectively any of the winding sets in parallel and/or in series, or remaining alone to produce a three-phase a-c source 30. Thus, the controller unit 25, depending on the rpm of the rotor 3, makes not only conduction control to the electromagnet coils 10 but also on-off control of the switching relays to connect the winding sets in parallel and/or in series, thereby yielding the three-phase a-c source 30 of a desired a-c voltage. The controller unit 25 includes a rectifier 31 where the produced power of the desired voltage is rectified to a d-c of, for example 24V, and an inverter 29, yielding a three-phase a-c of 50~60 Hz at 200V.

Figure 7:
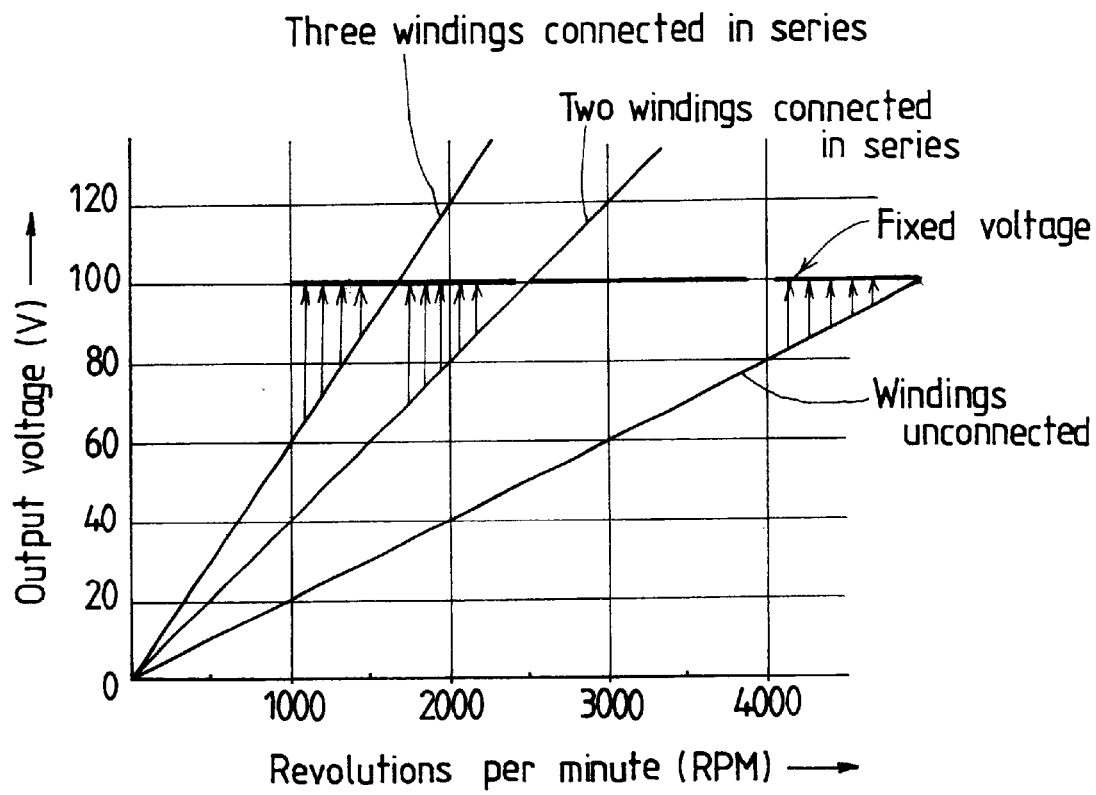
FIGS. 7(A) and (B) are graphic representations showing rpm vs. output voltage produced by the motor-generator shown in FIG. 1.
Figure 7:
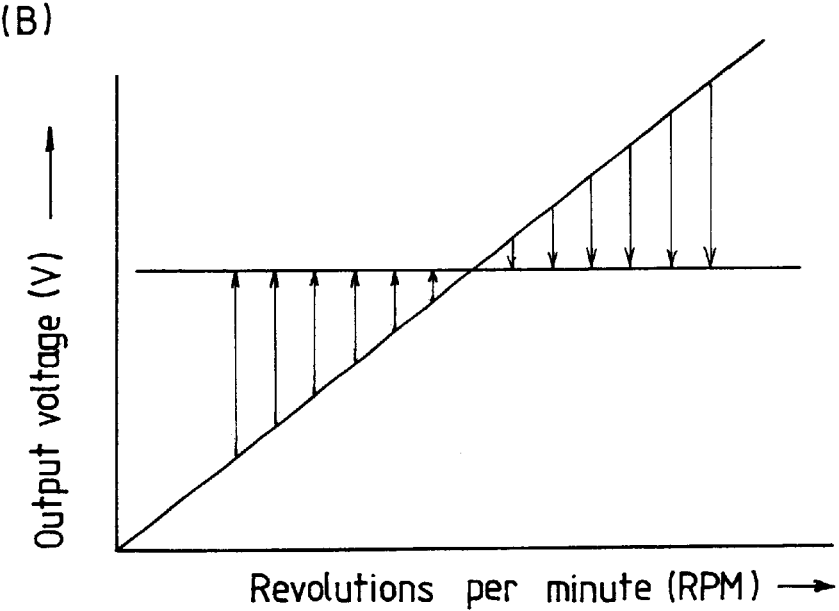

For instance, when the controller unit 25 turns on the relays 30C, 30D and 30G, while turns off the residual relays, all windings remain unconnected, thus producing an output voltage as shown in FIG. 7(A). When the relays 30B, 30E and 30H are turned on while other relays are turned off, any two windings come into series connection, thus producing another output voltage as shown in FIG. 7(A). Moreover, when the relays 30A, 30F and 30I are turned on while other relays are turned off, three windings are connected in series, thereby producing a further another output voltage as shown in FIG. 7(A). It is to be noted that all windings 8 are allowed to be connected in series as shown in FIG. 7(B). The controller unit 25, as stated just earlier, controls the on-off operation of the relays, depending on the rpm of the rotor 3, thereby realizing the output voltage (V) of fixed level as shown in FIG. 7(A). As an alternative, a low-voltage, large-current generator may be provided in which the windings 8 on the stator 4 are constructed in phase in matching with the number of pole of the permanent magnet on the rotor 3 and the winding sets 1U-1V-1W, 2U-2V-2W and 3U-3V-3W are connected in parallel.

A second embodiment of the motor-generator according to the present invention will be hereinafter described with reference to FIGS. 8, 9 and 10. In the embodiment stated later, the motor-generator serves as the motor.

The motor-generator includes a stator housing 1a composed of a pair of housing halves 1Aa, 1Aa jointed together by means of a threaded bolt 27a, magnetic path cases 1Ba, 1Ba fixed to the housing halves 1Aa, 1Aa at axially opposite ends of the stator housing, each to each end, and nonmagnetic covering members 1Ca, 1Ca wrapping around the outside periphery of the magnetic path cases 1Ba, 1Ba, each around each case, a rotor shaft 2a supported for rotation by means of ball bearings 13a installed in the magnetic path cases 1Ba, 1Ba through nonmagnetic material, not shown, a rotor 3a of a permanent-magnet member 5a mounted on the rotor shaft 2a against rotation, and a stator 4a arranged around the outside periphery of the rotor 3a to define an air gap 17a between them and fixed to the stator housing 1. The rotor 3a is clamped between axially opposite retainer plates 12a, which come into abutment against axially opposing ends of the rotor 3a, each to each end, and kept on the rotor shaft 2 against rotation by tightening fixing nut 11a on threaded shaft ends 24a of the rotor shaft 2a. The retainer plates 12a are arranged so closely adjacent at their outside peripheries to the magnetic path cases 1Ba to leave minute clearances between them.

The rotor shaft 2a has at its one end, for example, an input pulley, which is in turn connected drivingly to an output shaft of the engine through an endless belt. The stator 4a is composed of a stator core 20a built up of thin sheet laminations, which has cavities 25a for containing stator windings 14a therein. The stator core 20a is slotted at 21a to open radially inwardly the cavities 25a to the air gap 17a, thereby separating teeth 20Aa in the stator core 20a from each other.

With the motor-generator stated herein, electromagnets 9a are arranged at the axially opposite ends of the rotor 3a, each to each end, to increase the torque of the rotor shaft 2a supported for rotation relatively to the stator 4a fixed to the stator housing 1a. The electromagnets 9a are composed of cylindrical electromagnet core 6a extended lengthwise the rotor shaft 2a beyond axially opposite ends of the rotor 3a, and annular electromagnet coils 19a arranged inside the magnetic path cases 1Ba in the stator housing 1a in opposition to the electromagnet core 6a at the axially opposite ends, each to each end. Thus, the present motor-generator is characterized in that the electromagnet core 6a is arranged extending lengthwise on the rotor shaft 2a to allow the magnetic force created by the electromagnets 9a to flow smoothly through the magnetic permeable member without magnetic saturation, while a yoke 7a extends lengthwise along the electromagnet core 6a to allow the magnetic force developed between the rotor 3a of the permanent-magnet pieces 5a and the stator 4a to flow smoothly through a short path. The electromagnet core 6a is formed in a cylindrical configuration, in which platy laminations 6Aa, each equal in width with any permanent-magnet piece 5Aa of the permanent-magnet member 5a, are arranged circumferentially with any nonmagnetic member 22a being interposed between any two adjacent platy laminations 6Aa.

The rotor 3a is comprised of the electromagnet core 6a of more than one platy lamination 6Aa arranged circumferentially around the rotor shaft 2a in the form of cylinder with the nonmagnetic pieces 22a being interposed between any two adjacent platy laminations 6Aa, the cylindrical yoke 7a arranged over the electromagnet core 6a in close contact with the outside periphery of the electromagnet core 6a, the permanent-magnet member 5a of more than one permanent-magnet piece 5Aa arranged in close contact with the outside periphery of the cylindrical yoke 7a in the form of cylinder in such an array that the poles on either permanent-magnet piece alternate in polarity circularly around the rotor, and a nonmagnetic reinforcing member 16a covering over the outside circumference of the permanent-magnet member 5a. The permanent-magnet member 5a is formed in the form of hollow cylinder and composed of permanent-magnet pieces 5Aa elongated axially and arranged circumferentially in juxtaposition with spaced apart from each other, and nonmagnetic pieces 23a each interposed between any two adjacent permanent-magnet pieces 5Aa. The outer periphery of the permanent-magnet member 5a is finished by cylindrical grinding to an accurate circle in cross section, thus formed in a substantial cylinder in overall configuration. Especially, the yoke 7a is made of magnetic permeable material formed in an overall cylinder.

The electromagnet core 6a includes radial extensions 18a made in close contact with the rotor 3a so as to allow the magnetic flux to pass along the direction of the poles of the permanent-magnet member 5a. The radial extensions 18 are each notched at angular intervals 15a to axially space apart away the rotor 3a from the radial extensions 18. The electromagnet coils 19a are laid around the electromagnet core 6a at axially opposite areas jutting axially outwardly of the axial ends of the rotor 3a, with spaced apart from the electromagnet core 6a. An electric current in the electromagnet coils 19a induces lines of magnetic flux along the axial direction of the electromagnet core 6a, which are allowed to flow through the electromagnet core 6a. The electromagnets 9a are energized at a time when the controller unit 1a makes the electromagnet coils 19a conductive in response to a low rpm of the rotor shaft 2a, thereby developing the lines of magnetic flux identical in direction with the lines of magnetic flux created in the permanent-magnet member 5a. The radial extensions 18a of the electromagnet core 8a extend radially outwardly to the associated lengthwise end of the reinforcing member 16a, with keeping close contact with the associated lengthwise ends of the yoke 7a and permanent-magnet member 5a. Since the permanent-magnet member 5a is similar in construction with the permanent-magnet member 5 in the first embodiment stated earlier, the previous description will be applicable.

Figure 8:
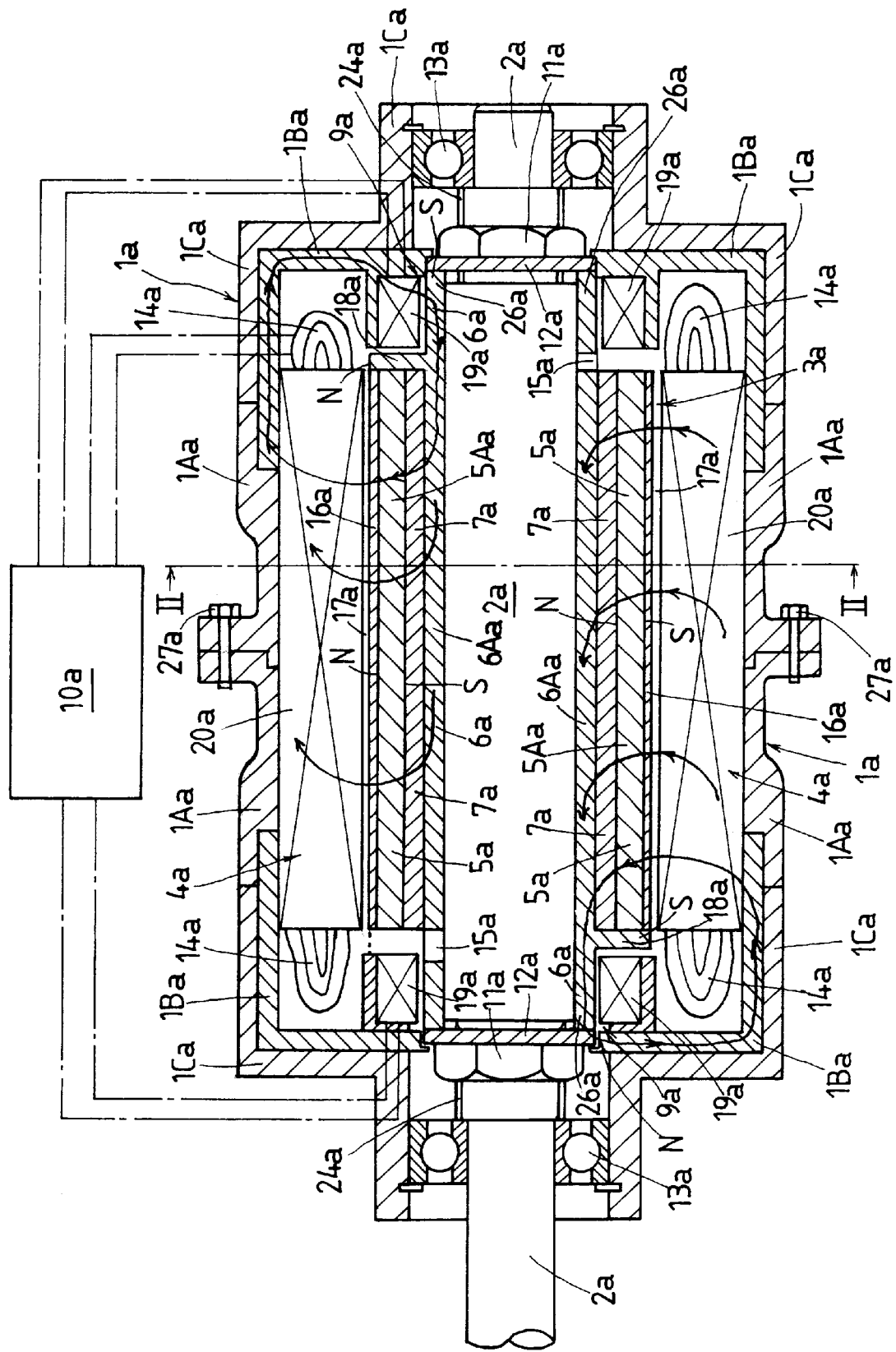
FIG. 8 is an axial sectional view showing a second embodiment of a motor-generator in accordance with the present invention.

To help ensure the flow of magnetic flux along the poles of the permanent-magnet members 5a in the motor-generator constructed as stated earlier, the electromagnet core 6a is arranged in such a manner as laid at any one axial end of the rotor 3a, or the right-hand end viewed in FIG. 8 in opposition to any permanent-magnet piece, or the topside piece in FIG. 8 of the permanent-magnet member 5a, which is disposed with the N-pole being outside the curved periphery and the S-pole inside the curved periphery, whereas at another axial end of the rotor 3a, or the left-hand end viewed in FIG. 8 in opposition to any permanent-magnet piece, or the bottom piece in FIG. 8 of the permanent-magnet member 5a, which is disposed with the N-pole being inside the curved periphery and the S-pole outside the curved periphery. That is to say, the topside permanent-magnet piece 5Aa of the permanent-magnet member 5a has poles directed radially with the S-pole being inside periphery and the N-pole outside periphery, and the associated electromagnet core end is arranged in such a relation that the upward extension 18a thereof has the N-pole, while any one axial end 26a thereof abutting against the associated retainer plate 12a has the S-pole. As opposed to the above, the bottom permanent-magnet piece 5Aa of the permanent-magnet member 5a is disposed with the N-pole being inside the periphery while the S-pole being outside the periphery, and another axial end of the electromagnet core 6a is arranged in such a relation that the downward extension 18a thereof has the S-pole while the axial end 26a thereof making contact with the associated retainer plate 12a has the N-pole.

Figure 9:
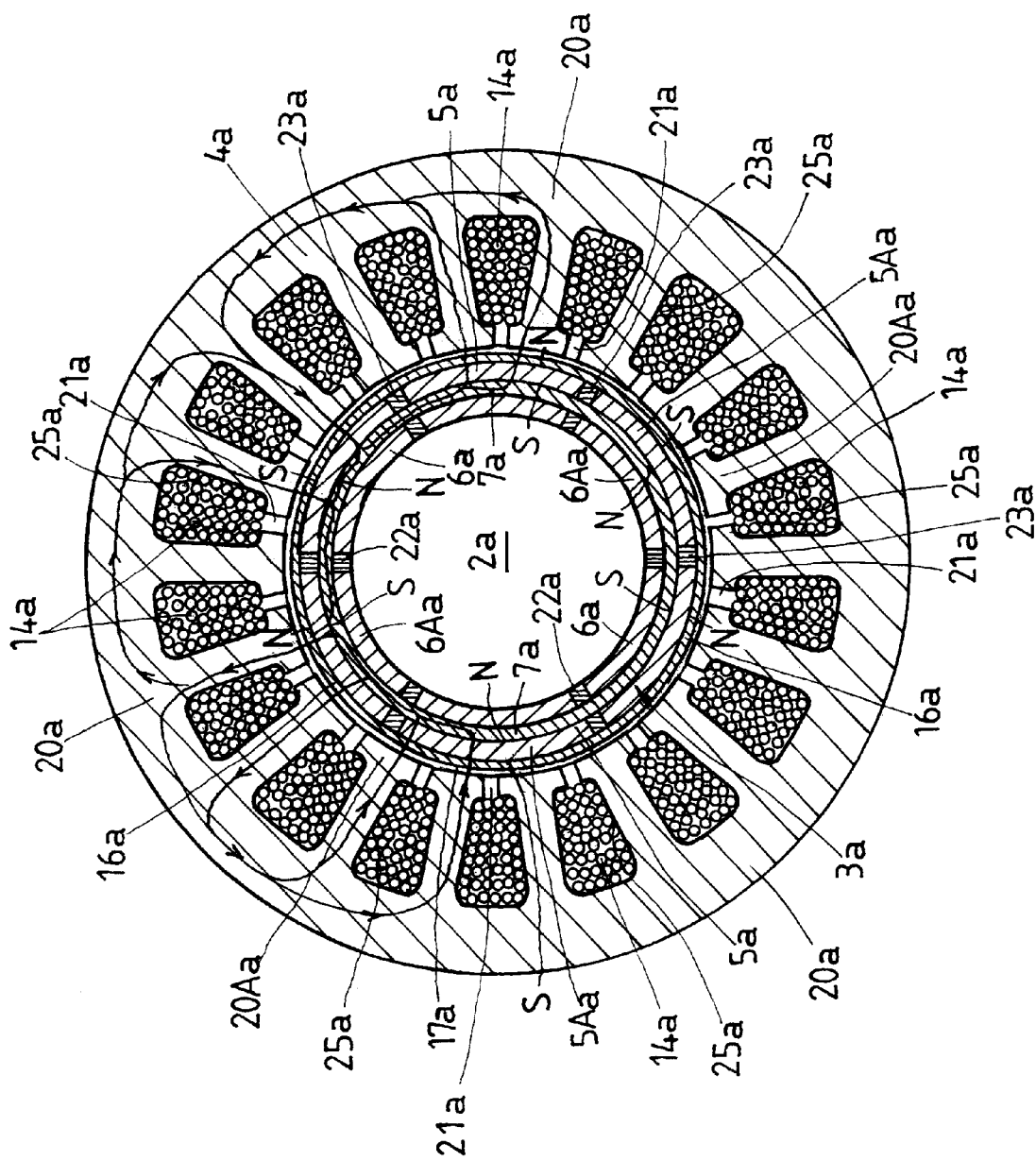
FIG. 9 is a cross-sectioned view of the motor-generator of FIG. 8 taken on the plane II—II of that figure.
Figure 10:
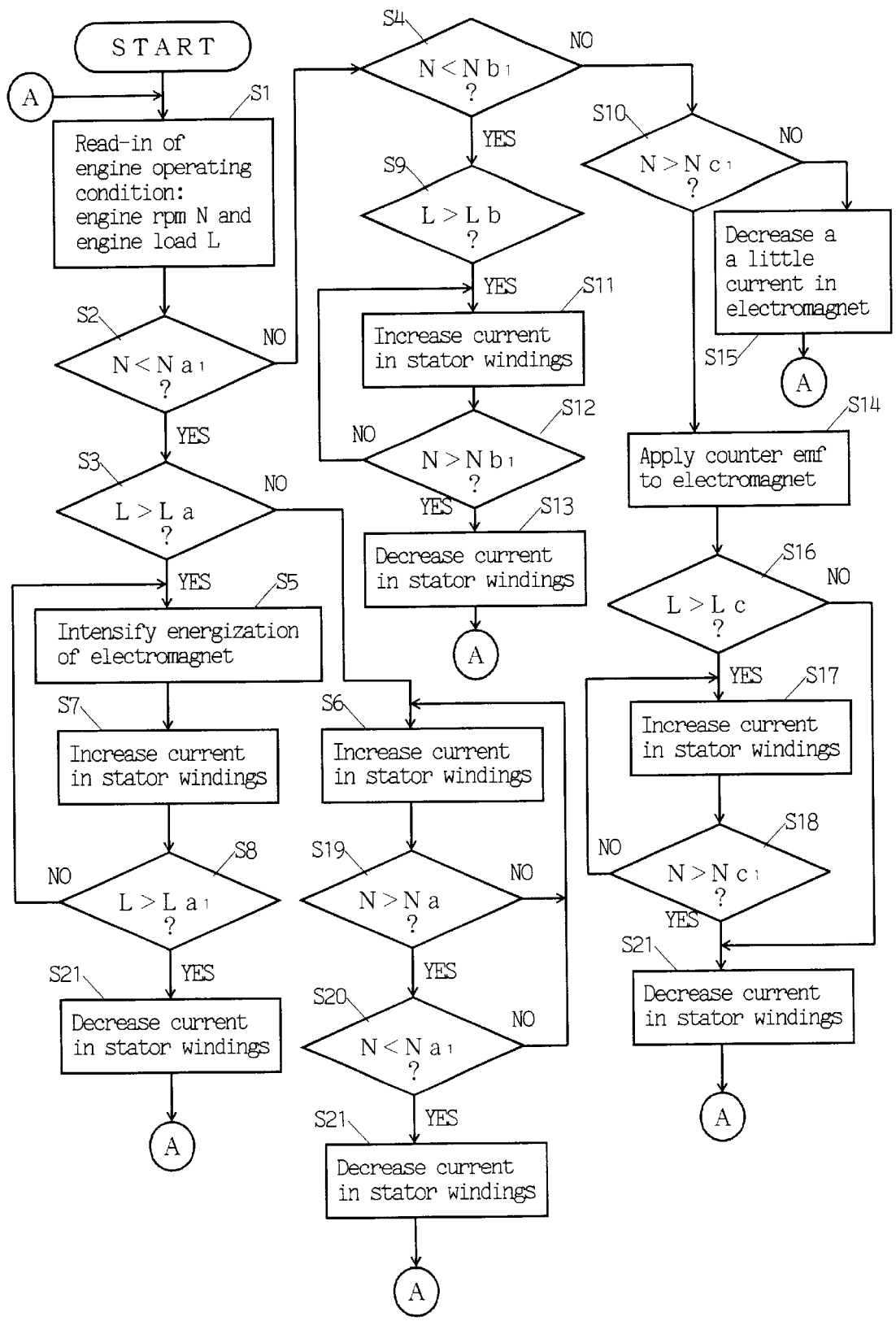
FIG. 10 is a flow sheet explaining operating procedure of the motor-generator shown in FIG. 8.

With the permanent-magnet piece 5Aa of the permanent-magnet member 5a having the N-pole outside the piece and the S-pole inside the piece, for example the topside permanent-magnet pieces 5Aa in FIG. 8, the magnetic flux established in the air gap between the rotor 3a and the stator 4a, as passing from the inside S-pole to the outside N-pole, makes a closed path of magnetic flux coming from and entering the permanent-magnet piece 5Aa through any stator tooth 20Aa, the stator core 20a, any adjoining stator tooth 20Aa, any adjoining permanent-magnet piece 5Aa and the yoke 7a, as shown in FIG. 9. Although the electromagnets 9a develop at the lengthwise opposing ends of the rotor 3a, only the magnetic flux created at the electromagnet 9a placed on any one rotor end, for example the right-side rotor end viewed in FIG. 8, where the N-pole is axially inside or nearby the rotor end while the S-pole is axially outside or far away the rotor end, is superposed on the magnetic force exerted by the topside permanent-magnet piece 5Aa. Namely, the magnetic flux developed by the right-side electromagnet 9a flows along a closed magnetic path coming from and entering the electromagnet core 6a through the yoke 7a, the permanent-magnet piece 5Aa, any stator tooth 20Aa, the stator core 20a, any associated magnetic path case 1Ba and the associated electromagnet coil 19a. Thus, the magnetic flux established in the air gap between the permanent-magnet rotor 3a and the stator 4a is combined with the magnetic flux created by any electromagnet 9a to come into the boosted magnetic force lines equal in flowing direction to increase the flux density to intensify the torque of the rotor shaft 2a.

As opposed to the topside permanent-magnet piece 5Aa of the permanent-magnet member 5a having the N-pole outside the piece and the S-pole inside the piece, the bottom permanent-magnet piece 5Aa in FIG. 8 is magnetized in the S-pole at the radially outside thereof while in the N-pole at the radially inside thereof. Therefore, the magnetic flux established in the air gap between the rotor 3a and the stator 4a, as passing from the outside S-pole to the inside N-pole, makes a closed path of magnetic flux coming from and entering the bottom permanent-magnet piece 5Aa through the yoke 7a, any adjoining permanent-magnet piece 5Aa, any stator tooth 20Aa, the stator core 20a and any adjoining stator tooth 20Aa. Moreover, only the magnetic flux created at the electromagnet 9a placed at any one rotor end, for example the left-side rotor end viewed in FIG. 8, where the S-pole is axially inside or nearby the rotor end while the N-pole is axially outside or far away the rotor end, is superposed on the magnetic force exerted by the bottom permanent-magnet piece 5Aa. Namely, the magnetic flux developed by the left-side electromagnet 9a flows along a closed magnetic path coming from and entering the electromagnet core 6a through the associated electromagnet coil 19a, the associated magnetic path case 1Ba, the stator core 20a, any stator tooth 20Aa, the permanent-magnet piece 5Aa and the yoke 7a. Thus, the magnetic flux established in the air gap between the permanent-magnet rotor 3a and the stator 4a is also combined with the magnetic flux created by any electromagnet 9a to come into the boosted magnetic force lines equal in flowing direction to increase the flux density to intensify the torque of the rotor shaft 2a.

The rotor shaft 2a is encircled with the electromagnet core 6a, which may be finished by machining to determine the diameter of the combined shaft. The electromagnet core 6a is made of laminated sheets of any material much high in magnetic permeability such as ferrite, molybdenum-nickel-iron alloy, sendust, amorphous ferroalloys, and so on. The reinforcing member 16a is made of, for example metallic reinforcing wire, wound nonmagnetic carbon wire, wound nonmagnetic metal wire, wound thin sheet, and so on. Then, nonmagnetic resinous material is poured in all clearances remaining in the reinforcing member 26a, between any adjacent permanent-magnet pieces 5Aa and between any adjoining laminations 6Aa to fill the clearances with the nonmagnetic pieces 22a, 23a. Thus, the rotor 3 is completed. The nonmagnetic resinous material may be selected from aluminum, austenite steels, enamel materials and mixture of iron, copper and glass materials.

With the motor-generator constructed as stated earlier, the controller unit 10a to regulate the magnetic force created by the electromagnets 9a issues an instruction to render the electromagnet coils 19a conductive in response to the low speed in rpm of the rotor shaft 2a, making the electromagnets 9a develop additional magnetic force to boost the magnetic force of the permanent-magnet member 5a, thereby increasing the torque at low speed of the rotor shaft 2a. In response to the high speed in rpm of the rotor shaft 2a, in contrast, the controller unit 10a supplies another instruction to render the electromagnet coils 19a conductive in the direction reverse to that in the low speed, making the electromagnets 9a develop a magnetic force to decay the magnetic force of the permanent-magnet member 5a, thereby lowering the emf produced by the rotor 3a to reduce the torque at high speed of the rotor shaft 2a.

In an event where rpm N is kept in a preselected range of rpm Na~$Na_i$ while load L is in a preselected range of load La~$La_1$, the controller unit 10a energizes the electromagnets 9a to intensify the magnetic force of the permanent-magnet member 5a with the electromagnets 9a. In another event where rpm N is kept in a preselected range of rpm $Na_1$~$Nb_1$ while load L is in a preselected range of load Lb~$Lb_1$, the controller unit 10a deenergizes the electromagnets 9a to render the magnetic force of the electromagnets 9a null. In a further another event where rpm N is in a preselected range of rpm $Nb_1$~$Nc_i$ while load L is not more than load Lc, the controller unit 10a energizes the electromagnets 9a in reverse direction to decrease the magnetic force of the permanent-magnet member 5a with the electromagnets 9a. On repair, adjustment, correction and so on of the of the electromagnet, the electromagnet coil is energized manually so as to weaken the magnetic force of the permanent-magnet, thereby making the occurrence of cogging less.

How the motor-generator constructed as stated earlier operates will be discussed in the following with reference to FIG. 10. The numbers are used for specifying branches in the flow of control and for referencing in the discussions that follow.

S1. The controller unit 10a reads in the operating condition of engine: engine rpm N and engine load L.

S2. Determine whether the engine operates at a low speed where the detected rpm N is less than a preselected rpm $Na_1$.

S3. Whenever the engine operates at the low speed in rpm, determine whether the detected engine load L is above a preselected load La.

S5. Whenever the engine load L exceeds the preselected load La, intensify the energization of the electromagnets 9a to increase a torque at low speed of the motor-generator.

S7. Increase a current in the stator windings 14 of the stator 4a.

S8. After the torque at low speed of the motor-generator has risen, the controller unit 10a determines whether the detected load L is more than a preselected load La1 to keep the load L less than and equal to the preselected load $La_1$. When the detected load L remains small, resume at step 5 to repeat the series after the step 5 to still continue intensifying the energization of the electromagnets 9 while increasing the current in the stator windings 14a of the stator 4a.

S21. Whenever the detected load L becomes too large, decrease the current in the electromagnets 9a while reduce the current in the stator windings 14a of the stator 4a, thereby controlling the torque at low speed to a proper torque.

S4. Whenever the detected rpm N has been found not less than the preselected rpm $Na_1$ at the step 2, determine whether the rpm N is less than a preselected rpm $Nb_1$.

S9. Whenever the rpm N is less than a preselected rpm $Nb_1$, determine whether the detected load L is above a preselected a preselected load Lb.

S11. Whenever the load L exceeds the preselected load Lb, increase the current in the stator windings 14a to raise the rpm N with the result of increasing the torque at low speed of the motor-generator.

S12. After the rpm N has risen and therefore the torque at low speed of the motor-generator has increased, the controller unit 10a determines whether the detected rpm N is more than a preselected rpm $Nb_1$. When the rpm N is not more than the preselected rpm $Nb_1$, resume at step 11 to repeat the series after the step 11 to still continue increasing the current in the stator windings 14a to elevate the rpm N.

S13. Whenever the rpm N is above the preselected rpm $Nb_1$, decrease the current in the stator windings 14a of the stator 4a to keep the rpm N against becoming more than the preselected rpm $Nb_1$, thereby regulating the torque at low speed to a proper torque level.

S6. Whenever the detected load L has been found not more than the preselected load La at the step 3, there is no need of intensifying the energization of the electromagnets 9a to increase the torque at low speed. Nevertheless, increase the current in the stator windings 14a of the stator 4a to raise the load L.

S19. Determine whether the rpm N is above the preselected rpm Na. When the rpm N has been found not more than the preselected rpm Na, resume at step 6 to increase the current in the stator windings 14a of the stator 4a, thereby raising the rpm N.

S20. Whenever the rpm N is above the preselected rpm Na, determine whether the rpm N is below the preselected rpm $Na_1$. When the rpm N has been found more than and equal to the preselected rpm $Na_1$, resume at step 6 to increase the current in the stator windings 14a of the stator 4a, thereby raising the rpm N.

S21. Whenever the rpm N is below the preselected rpm Na, at step 20, reduce the current in the stator windings 14a of the stator 4a so as to keep the rpm N against becoming above the preselected rpm $Na_1$, thereby controlling the torque at low speed to a proper torque.

S10. Whenever the detected rpm N has been found not less than the preselected rpm $Nb_1$ at step 4, determine whether the rpm N is above a preselected rpm $Nc_1$.

S14. Whenever the rpm N is above the preselected rpm $Nc_1$, the electromagnets 9a carry reverse current to weaken the magnetic force of the permanent-magnet 5a of the rotor 3a with the result of retarding the revolving speed in rpm of the rotor 3a, thereby reducing the rpm N.

S15. When the detected rpm N has been found not more than the preselected rpm $Nc_1$ at step 10, decrease a little the current in the electromagnets 9a to reduce the rpm N.

S16. Determine whether the load L is above the preselected load Lc.

S17. Whenever the load exceeds the preselected load Lc, increase the current in the stator windings 14a of the rotor 4a to control the load to a proper load.

S18. Determine whether the rpm N is above the preselected rpm $Nc_1$.

S21. Whenever the rpm N is more than the preselected rpm $Nc_1$, decrease the current in the stator windings 14a of the stator 4a to reduce the rpm N to a proper rpm. Moreover, when the load L has been found not more than the preselected load Lc at step 16, there is no need of increasing the current in the stator windings 14a. Nevertheless, decrease the current in the stator windings 14a of the stator 4a to control the rpm N to a proper rpm value.

Next, a third embodiment of the motor-generator according to the present invention will be explained hereinafter with reference to FIGS. 11 and 12. As the motor-generator of the third embodiment is also made in high-torque construction, most of components of the third embodiment are the same as previously described in the second embodiment stated earlier. To that extent, the components have been given the same reference characters affixed with "b" instead of suffix "a", so that the previous description will be applicable. The motor-generator is characterized by a construction in which there are provided electromagnets 9b to intensify a torque exerted on the rotor shaft 2b supported for rotation relatively to a stator 4b, the electromagnets 9b being comprised of cylindrical electromagnet cores 8b arranged around a rotor shaft 2b at axially opposing ends of a rotor 3b, each to each end, and circular electromagnet coils 19b arranged inside magnetic path cases 1Bb in the stator housing 1b in opposition to the electromagnet cores 8b, and also there is provided a magnetic permeable member 6b to help ensure smooth flowing of magnetic forces developed in both the electromagnets 9b and a permanent-magnet member 5b. The permeable member 6b is formed in a cylindrical configuration, in which platy laminations 6Ab, each equal in width with any permanent-magnet piece 5Ab of the permanent-magnet member 5b, are arranged circumferentially with any nonmagnetic member 22b being interposed between any two adjacent platy laminations 6Ab, so that the magnetic flux is allowed to pass along the magnetic poles of the permanent-magnet member 5b.

The rotor 3b is composed of the magnetic permeable member 6b of more than one permeable piece arranged circumferentially spaced apart from each other around the outside periphery of the rotor shaft 2ba with any nonmagnetic member 22b being interposed between any two adjacent permeable pieces, a cylindrical magnetic path core 7b arranged in close contact with the outside periphery of the permeable member 6b, the permanent-magnet member 5b of more than one permanent-magnet piece 5Ab arranged circumferentially in close contact with the outside periphery of the magnetic path core 7b in the form of cylinder in which unlike poles alternate circularly around the rotor shaft 2b, the electromagnet cores 8b arranged outside the axially opposing ends of the permeable member 6b, each to each end, and a nonmagnetic reinforcing member 16b fixed around the outside periphery of the permanent-magnet member 5b.

Moreover, the electromagnet cores 8b fit on the rotor shaft 2b to form the electromagnet 9b are each provided with radial extensions 18b coming into close contact with the rotor 3b so as to permit the magnetic flux to pass along the pole direction of the permanent-magnet member 5b, and notches 15 arranged at angular intervals to space axially the extensions 18b apart from each other. The electromagnet coils 19b are each wound around the associated electromagnet core 8b with spaced away from the electromagnet core 8b. Thus, a current flowing in any electromagnet coil 19b creates axial magnetic poles in the electromagnet core 8b to help ensure the smooth flow of magnetic forces. That is to say, when a controller unit 10b makes the electromagnet coils 19b conductive in response to a low rpm of the rotor shaft 2b, the electromagnets 9b are energized to develop the lines of magnetic flux identical in direction with the lines of magnetic flux created in the permanent-magnet member 5b. Moreover, the electromagnet core 8b is each composed of an annular sleeve 26b notched at angular Intervals 15b, and radial extensions 18b integral with the annular sleeve 26b. The radial extensions 18b of the electromagnet cores 8b extend to the reinforcing member 16b, with keeping close contact with the associated lengthwise ends of the permeable member 6b, magnetic path core 7b and permanent-magnet member 5b.

Figure 11:
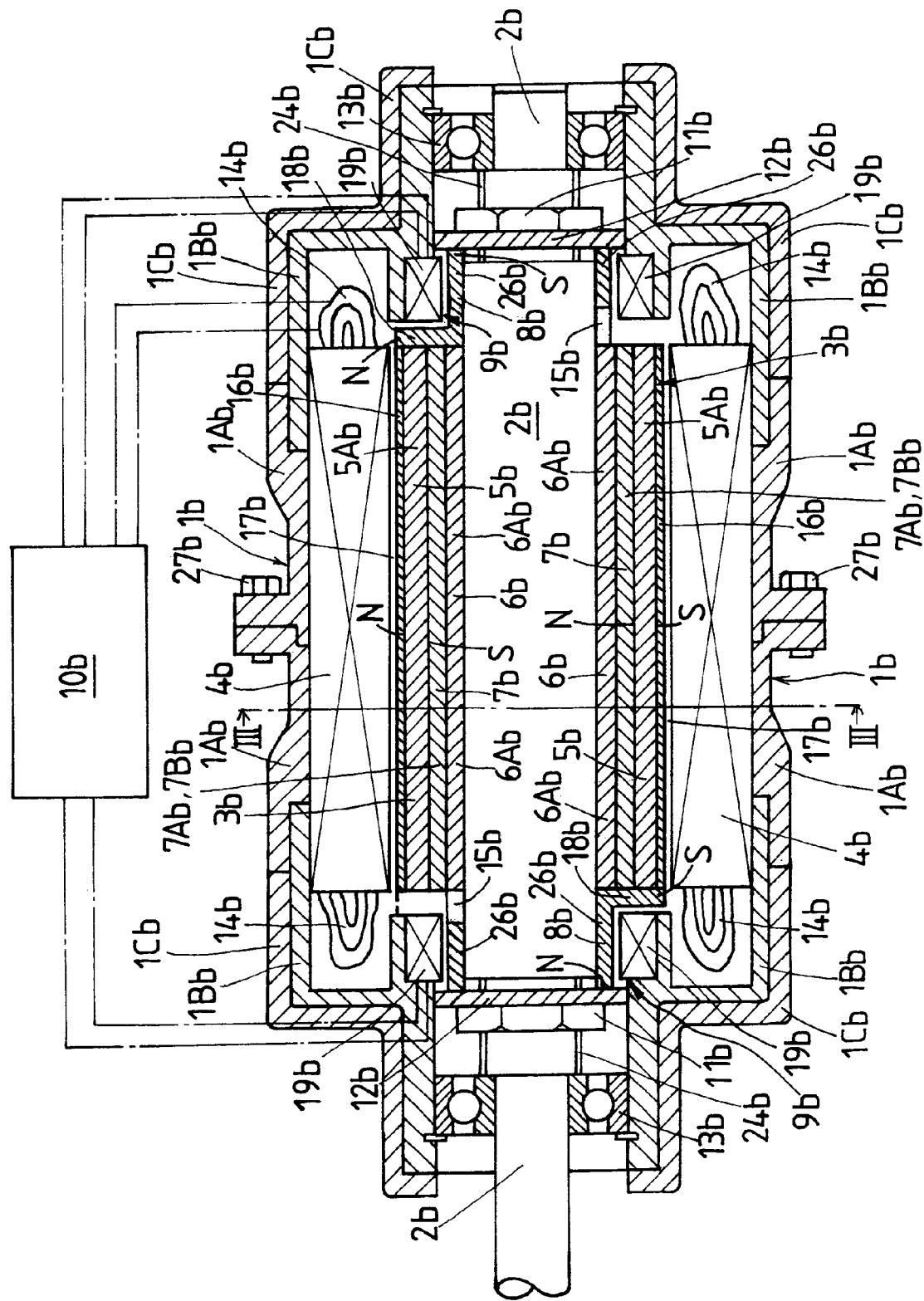
FIG. 11 a axial sectional view showing a third embodiment of a motor-generator in accordance with the present invention.
Figure 12:
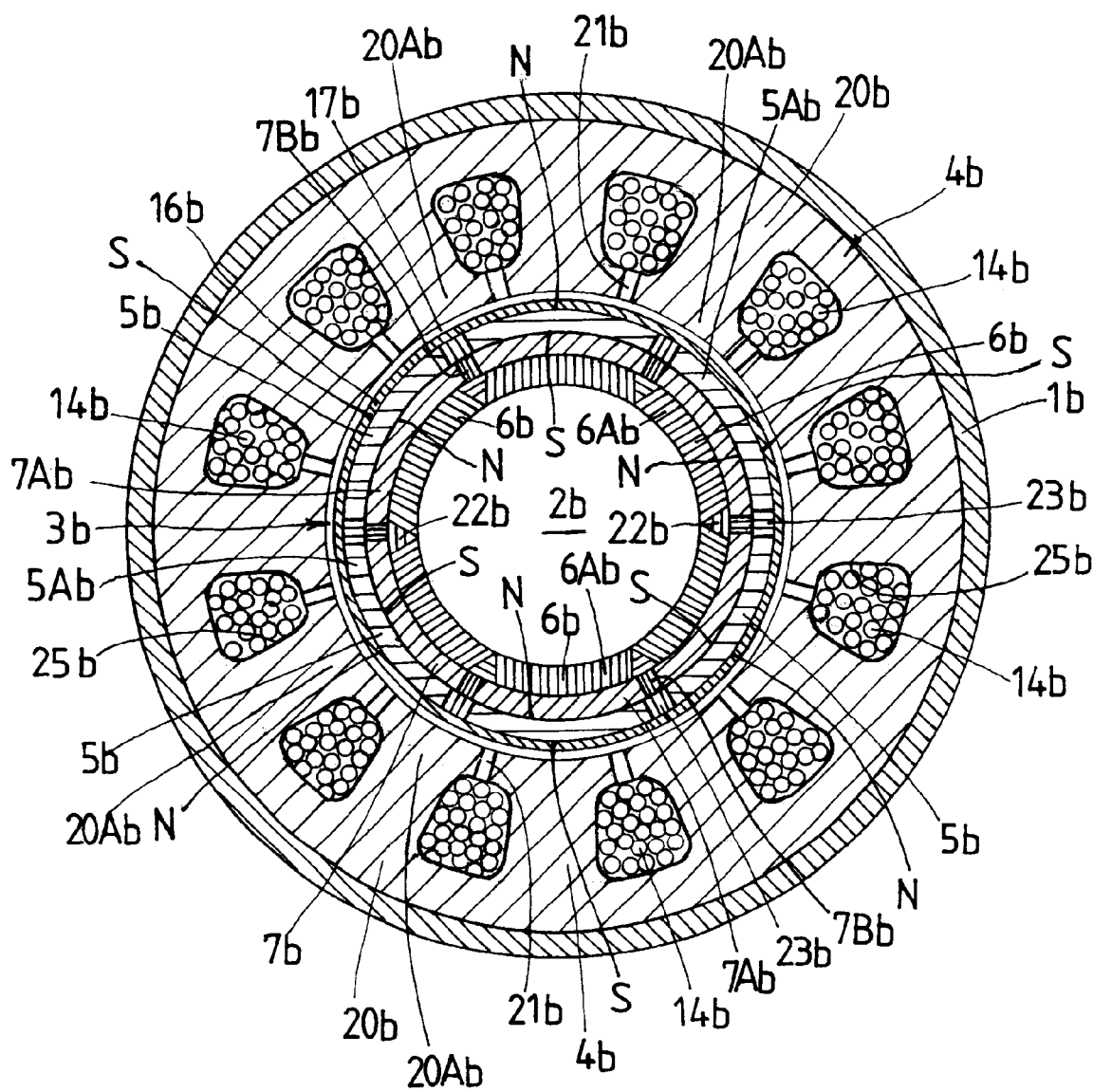
FIG. 12 is a cross-sectioned view of the motor-generator of FIG. 11 taken on the plane III—III of that figure.

To help ensure the flow of magnetic flux along the poles of the permanent-magnet members 5b in the motor-generator constructed as stated just above, the electromagnet core 8b at any one axial end of the rotor 3b, or the right-hand end viewed in FIG. 11 is laid in opposition to any permanent-magnet piece, or the topside piece in FIG. 11 of the permanent-magnet member 5b, which is disposed with the N-pole being outside the curved periphery and the S-pole inside the curved periphery, whereas another electromagnet core 8b at another axial end of the rotor 3b, or the left-hand end viewed in FIG. 11 laid in opposition to any permanent-magnet piece, or the bottom piece in FIG. 11 of the permanent-magnet member 5, which is disposed with the N-pole being inside the curved periphery and the S-pole outside the curved periphery. That is to say, the topside permanent-magnet piece 5Ab of the permanent-magnet member 5b has poles directed radially with the S-pole being inside periphery and the N-pole outside periphery, and the upward extension 18b of the topside electromagnet core 8b has the N-pole while the annular sleeve 26b of the topside electromagnet core 8b, which makes abutment with the associated retainer plate 12b, has the S-pole. As opposed to the above, the bottom permanent-magnet piece 5Ab of the permanent-magnet member 5b is disposed with the N-pole being inside the curved periphery and the S-pole outside the curved periphery, and another electromagnet core 8b is arranged in such a relation that the downward extension 18b thereof has the S-pole, while the annular sleeve 26b abutting against an associated retainer plate 12b has the N-pole. Thus, the lines of magnetic force created by both the permanent-magnet member 5b and the electromagnets 9b are allowed to pass easily with forming loops of field flux.

With the permanent-magnet piece 5Ab of the permanent-magnet member 5b having the N-pole outside the piece and the S-pole inside the piece, for example the topside permanent-magnet pieces 5Ab in FIG. 11, the magnetic flux established in the air gap between the rotor 3b and the stator 4b passes from the inside S-pole to the outside N-pole. Therefore, although the electromagnets 9b develop the magnetic forces at the axially opposing ends of the rotor 3b, only the magnetic flux created at the electromagnet 9b placed on any one rotor end, for example the right-side rotor end viewed in FIG.11, where the N-pole is axially inside or nearby the rotor end while the S-pole is axially outside or far away the rotor end, is superposed on the magnetic force exerted by the topside permanent-magnet piece 5Ab. This causes the increase of torque exerted on the rotor shaft 2b. Namely, the total magnetic flux developed by the right-side electromagnet 9b and the topside permanent-magnet piece 5Ab of the permanent-magnet member 5b flows along a closed magnetic loop coming from and entering the rotor 3b through the stator core 20b, any associated magnetic path case 1Bb and the associated electromagnet core 8b.

As opposed to the topside permanent-magnet piece 5Aa of the permanent-magnet member 5a, the bottom permanent-magnet piece 5Ab in FIG. 11 is magnetized in the S-pole at the radially outside thereof while in the N-pole at the radially inside thereof. Therefore, the magnetic flux established in the air gap between the rotor 3b and the stator 4b, as passing from the outside S-pole to the inside N-pole, is superposed with the magnetic flux created at the electromagnet 9b placed on any one rotor end, for example the left-side rotor end viewed in FIG. 11, where the S-pole is axially inside or nearby the rotor end while the N-pole is axially outside or far away the rotor end. Thus, the total magnetic flux superposed one on the other in the same direction is made increased to raise the torque on the rotor shaft 2b. Namely, the overall magnetic flux developed by the left-side electromagnet 9b and the bottom permanent-magnet piece 5Ab of the permanent-magnet member 5b flows along a closed magnetic loop coming from and entering the rotor 3b through the associated electromagnet 9b, the associated magnetic path case 1Ba inside the stator housing 1b, and the stator core 20b.

Both the magnetic permeable member 9b and the electromagnet core 8b are made of laminated sheets of any material much high in magnetic permeability such as ferrite, molybdenum-nickel-iron alloy, sendust, amorphous ferroalloys, and so on. The ferrite has the general formula: $Mn_x$ $Zn_y$ $Fe_z$, the concrete percentage (wt %) chemical composition of which is $MnO:ZnO:Fe_3O_4$=22:15:63, or $MnO:ZnO:Fe_3O_4$=15~19:13~17:67~78. The molybdenum-nickel-iron alloy is Ni—Fe magnetic alloy, the concrete percentage(wt %) chemical composition of which is Ni:Fe:Mo=79:17:4. As an alternative, the sendust is ferromagnetic alloy containing Fe—Si—Al, the concrete percentage(wt %) chemical composition of which is Fe:Si:Al=85:9.6:5.4.

With the motor-generator constructed as stated just above, a controller unit 10b in response to a low speed in rpm of the rotor shaft 2b issues an instruction to make the electromagnet coils 19b conductive to establish additional lines of magnetic force to be superposed on the magnetic force created by the permanent-magnet member 5b, thereby increasing the torque at low speed of the rotor shaft 2b. As opposed to the above, the controller unit 10b in response to a high speed of the rotor shaft 2b issues another instruction to make the electromagnet coils 19b conductive reversely in direction to the event at low speed, thus developing an additional magnetic force acting oppositely in direction to the magnetic force of the permanent-magnet member 5b whereby a counter electromotive force produced in the rotor 3b may be made small so as to reduce the torque at high speed of the rotor shaft 2b.

The reinforcing member 16b is made of reinforcing wires of ceramics and/or alloys coated with vitreous material, which are wound around the periphery of the permanent-magnet member 5b at an elevated temperature where the reinforcing wires are bonded together with the vitreous material.

Nonmagnetic resinous material is poured in all clearances remaining in the reinforcing member 16b, between any adjacent permanent-magnet pieces 5Ab and between any adjoining laminations 6Ab to fill the clearances with the nonmagnetic pieces 22b, 23b. Thus, the rotor 3b is completed. The nonmagnetic pieces 22b, 23b are composed of, for example admixture of vitreous material such as silicate glasses, borosilicate glasses and so on with any one selected from aluminum, austenite steels, enamels or mixture of iron and copper. To joint together any two adjacent permanent-magnet pieces 5Ab with the nonmagnetic pieces 23b, the admixture for the non-magnetic pieces 23b is filled together with ceramics such as $Al_2O_3$ into clearances between any two adjoining permanent-magnet pieces 5Ab, followed by heating up to 600° C.~300° C. to joint the adjacent permanent-magnet pieces 5Ab together with the nonmagnetic pieces 23b. Other nonmagnetic pieces 22b, as with the nonmagnetic pieces 23b described just above, may also joint together the magnetic permeable pieces 6Ab.

What is claimed is:

1. A motor-generator with a voltage stabilizer, comprising a multipolar permanent-magnet rotor mounted on a rotor shaft supported for rotation in a stator housing, a stator fixed to the housing with arranged around the rotor, and electromagnet coils fixed to axially opposing ends of the housing, each to each end, in opposition to axially opposing ends of the rotor, wherein the rotor is composed of a cylindrical magnetic path arranged around the rotor shaft and extended axially to areas confronting the electromagnet coils, a permeable member surrounding around the cylindrical magnetic path, and a permanent-magnet member of more than one permanent-magnet piece extended axially and arranged circumferentially around an outside periphery of the permeable member with N- and S-poles on either piece alternating in polarity circularly around the rotor, and wherein the cylindrical magnetic path includes an N-pole annular portion arranged confronting any one of the electromagnet coils, N-pole electromagnet magnetic paths stemming from the N-pole annular portion in opposition to the N-poles of the permanent-magnet pieces, an S-pole annular portion arranged confronting another of the electromagnet coils, and S-pole electromagnet magnetic paths stemming from the S-pole annular portion in opposition to the S-poles of the permanent-magnet pieces, the N-pole and S-pole electromagnet magnetic paths alternating in polarity circularly around the permanent-magnet member with nonmagnetic pieces being each interposed between any two adjacent electromagnet magnetic paths.

2. A motor-generator constructed as defined in claim 1, wherein around the outside periphery of the permanent-magnet member there is provided a first reinforcing member to keep the permanent-magnet member against falling off the rotor owing to a high centrifugal force, the reinforcing member being made of high tensile carbon fibers of a core material, which is impregnated with molten aluminum then, followed by solidification.

3. A motor-generator constructed as defined in claim 1, wherein both the N-pole and S-pole electromagnet magnetic paths are encircled with a second reinforcing member to be formed in an overall cylindrical configuration.

4. A motor-generator constructed as defined in claim 1, wherein nonmagnetic members of a material tough to pass the magnetic force, such as aluminum, copper alloys, resinous material, austenite SUS, and so on are filled in between any tip of the N-pole electromagnet magnetic path and the S-pole cylindrical portion and also between any tip of the S-pole electromagnet magnetic path and the N-pole cylindrical portion, and a clearance between any adjacent N-pole and S-pole electromagnet magnetic paths is made larger in distance than a sum of an air gap between the rotor and the stator and a clearance between the magnetic permeable member and the rotor.

5. A motor-generator constructed as defined in claim 1, wherein molten aluminum or resinous material of heat-resistant property is charged in any clearance between any two adjacent permanent-magnet pieces and also any clearance between any adjacent N-pole and S-pole electromagnet magnetic paths.

6. A motor-generator constructed as defined in claim 1, wherein the stator is comprised of a stator core with stator teeth arranged spaced circumferentially apart from each other to separate two adjacent stator slots, and windings wound on stator teeth with spanning some stator slots so as to be substantially equal out of phase, and wherein the windings are each grouped into more than one winding set shifted from each other to form three-phase wye-connections, which are allowed to be connected either in series or in parallel, so that a controller selectively changes over among output terminals led out of the connections every winding set, thus producing a desired output power in accordance with a rpm of the rotor.

7. A motor-generator constructed as defined in claim 6, wherein the stator windings are grouped into low-voltage winding sets and high-voltage winding sets, and the controller regulates magnetic flux to produce two types of power, which are different in rated voltage.

8. A motor-generator constructed as defined in claim 7, wherein the low-voltage winding sets and the high-voltage winding sets are connected in parallel to give a generation characteristic of low-voltage, large-current.

9. A motor-generator constructed as defined in claim 6, wherein the controller serves connecting in series the output terminals led out of the connections in response to an event where the engine or rotor is low in rpm, and reducing the number of the connections made in series as the rpm raises, thereby to ensure the desired output voltage kept always constant irrespective of variation in the rpm.

10. A motor-generator constructed as defined in claim 6, wherein with the rotor being operated in a preselected rpm range, the controller in response to the event where the output terminals are connected to provide the output of low voltage, makes the electromagnet coils conductive in a direction to increase the N-pole magnetic force, whereas in response to another event where the output is high in voltage, makes the electromagnets conductive in a reverse direction to decrease the N-pole magnetic force, thereby providing the desired output voltage kept always constant.

11. A motor-generator constructed as defined in claim 6, wherein the controller includes a rectifier where a produced power of the desired voltage is rectified to a d-c, and an inverter yielding an a-c of a desired frequency.

12. A motor-generator constructed as defined in claim 6, wherein the controller makes the electromagnet coils conductive in a manner to reduce the magnetic force of the permanent-magnet member when the motor-generator is used as a motor.

13. A motor-generator comprising a rotor shaft supported for rotation in stator housing, a rotor mounted on the rotor shaft, a stator arranged confronting an outside periphery of the rotor and fixed to the housing, and electromagnets arranged on the rotor shaft at axially opposing ends of the rotor, each to each end, wherein the rotor is composed of an electromagnet core of permeable pieces extended axially to electromagnets and arranged circumferentially around the rotor shaft with nonmagnetic pieces being each interposed between any two adjacent permeable pieces, a cylindrical yoke of permeable material arranged over the electromagnet core, and a permanent-magnet member of more than one permanent-magnet piece arranged around an outside periphery of the cylindrical yoke, with nonmagnetic pieces being each interposed between any two adjacent permanent-magnet pieces, in the form of cylinder in such an array that the poles on either permanent-magnet piece alternate in polarity circularly around the rotor, and wherein the electromagnets are each composed of any one of axially opposing ends of the electromagnet core surrounding the rotor shaft, and, an electromagnet coil arranged on a magnetic path case in the housing in opposition to the associated end, the electromagnet core being notches at angular intervals so as to provide magnetic circuits spaced circumferentially to flow the magnetic flux in axially but alternately opposite directions.

14. A motor-generator constructed as defined in claim 13, wherein the permeable pieces in the electromagnet core are each extended axially with a width equal to any one permanent-magnet piece of the permanent-magnet member so that the magnetic flux created by the electromagnets is allowed to enter the magnetic poles of the permanent-magnet member through the yoke and then flow to the stator side.

15. A motor-generator constructed as defined in claim 13, wherein any permeable piece of the electromagnet core is arranged in opposition to the permanent-magnet piece having poles directed radially with the S-pole being outside periphery and the N-pole inside periphery, and any adjacent permeable piece is in opposition to the permanent-magnet piece with the S-pole being inside periphery and the N-pole outside periphery, thus, ensuring a flow of magnetic flux along the poles of the permanent-magnet member.

16. A motor-generator constructed as defined in claim 13, wherein the magnetic flux passing through the rotor having the permanent-magnet pieces into the stator side flows along either a magnetic circuit coming from and entering any permanent-magnet piece through the yoke, any adjacent permanent-magnet piece, any stator tooth, a stator core and another stator tooth or other magnetic circuit opposite in direction at the permanent-magnet piece having reversed poles, and the yoke has a radial thickness that might be substantially saturated with the magnetic flux of the permanent-magnet member.

17. A motor-generator constructed as defined in claim 13, wherein the magnetic flux created by the electromagnet passes either a closed path coming from and entering the electromagnet core through the yoke, the stator tooth, the stator core, the magnetic path case and the electromagnet coil or other magnetic path in opposite direction.

18. A motor-generator constructed as defined in claim 13, wherein the electromagnet core is made of any material much high in magnetic permeability such as ferrite, molybdenum-nickel-iron alloy, sendust, amorphous ferroalloys, and so on.

19. A motor-generator constructed as defined in claim 13, wherein a controller in response to a low speed in rpm of the rotor shaft makes the electromagnet coils conductive to superpose additional lines of magnetic force flowing through the electromagnet core on the magnetic force created by the permanent-magnet member, thereby increasing a torque at low speed of the rotor shaft.

20. A motor-generator constructed as defined in claim 13, wherein the controller in response to a high speed of the rotor shaft makes the electromagnet coils conductive reversely in direction to the event at low speed, thus developing an additional magnetic force acting oppositely in direction to the magnetic force of the permanent-magnet member so as to reduce the torque at high speed of the rotor shaft.

21. A motor-generator constructed as defined in claim 13, wherein on readjustment of the motor, the controller makes the electromagnets conductive in a direction opposite to the event at low speed so as to render the magnetic force of the permanent-magnet member roughly null, thereby making the occurrence of cogging less.

22. A motor-generator comprising a rotor shaft supported for rotation in stator housing, a rotor mounted on the rotor shaft, a stator arranged confronting an outside periphery of the rotor and fixed to the housing, and electromagnets composed of annular electromagnet cores arranged on the rotor shaft at axially opposing ends of the rotor, each to each end, electromagnet coils arranged on magnetic path cases in the housing in opposition to the electromagnet cores, each to each core, wherein the rotor is composed of permeable member of permeable pieces arranged circumferentially around the rotor shaft in the form of cylinder with nonmagnetic pieces being each interposed between any two adjacent permeable pieces, a cylindrical magnetic path core of permeable pieces arranged circumferentially over the permeable member with nonmagnetic pieces being each interposed between any two adjacent permeable pieces, and a permanent-magnet member of more than one permanent-magnet piece arranged around an outside periphery of the magnetic path core, with nonmagnetic pieces being each interposed between any two adjacent permanent-magnet pieces, in the form of cylinder in such an array that the poles on either permanent-magnet piece alternate in polarity circularly around the rotor, and wherein the electromagnet cores are each composed of radial extensions coming in close contact with the permeable member of the rotor to ensure axial flows of magnetic flux, and an annular portion notched at angular intervals to separate axially the radial extensions apart from the rotor.

23. A motor-generator constructed as defined in claim 22, wherein the permeable member is formed in a cylindrical configuration, in which platy laminations, each equal in width with any permanent-magnet piece of the permanent-magnet member, are arranged circumferentially with any nonmagnetic member being interposed between any two adjacent platy laminations to help ensure the flow of magnetic flux along the poles of the permanent-magnet member.

24. A motor-generator constructed as defined in claim 22, wherein any one electromagnet core at any one axial end of the rotor is arranged in opposition to any permanent-magnet piece, which is disposed with the N-pole being outside the curved periphery and the S-pole inside the curved periphery, whereas another electromagnet core at axially opposing end of the rotor is arranged in opposition to any permanent-magnet piece, which is disposed with the N-pole being inside the curved periphery and the S-pole outside the curved periphery, thereby helping ensure the flow of magnetic flux along the poles of the permanent-magnet member.

25. A motor-generator constructed as defined in claim 22, wherein the radial extensions of the electromagnet core make close contact with their associated axial ends of the permeable member, the magnetic path core and the permanent-magnet member.

26. A motor-generator constructed as defined in claim 22, wherein both the permeable member and the electromagnet core are made of any material much high in magnetic permeability such as ferrite, molybdenum-nickel-iron alloy, sendust, and so on.

27. A motor-generator constructed as defined in claim 22, wherein a controller in response to a low speed in rpm of the rotor shaft makes the electromagnet coils conductive to superpose additional lines of magnetic force flowing through the electromagnet core on the magnetic force created by the permanent-magnet member, thereby increasing a torque at low speed of the rotor shaft.

28. A motor-generator constructed as defined in claim 22, wherein the controller in response to a high speed of the rotor shaft makes the electromagnet coils conductive in opposite direction to the event at low speed, thus developing an additional magnetic force acting oppositely in direction to the magnetic force of the permanent-magnet member so as to reduce the torque at high speed of the rotor shaft.

29. A motor-generator constructed as defined in claim 22, wherein the annular portion of the electromagnet core is made integral with the permeable member.

* * * * *